US012586063B2

(12) United States Patent　　　(10) Patent No.:　US 12,586,063 B2
O'Grady et al.　　　　　　　　　(45) Date of Patent:　Mar. 24, 2026

(54) FORTIFIED DECOUPLED STATE MACHINE REPLICATION

(71) Applicant: Ava Labs, Inc., New York, NY (US)

(72) Inventors: Patrick Robert O'Grady, Palo Alto, CA (US); Stephen John Buttolph, Brooklyn, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/038,099

(22) Filed: Jan. 27, 2025

(65) Prior Publication Data

US 2025/0245650 A1　　Jul. 31, 2025

Related U.S. Application Data

(60) Provisional application No. 63/625,117, filed on Jan. 25, 2024.

(51) Int. Cl.
　G06Q 20/38　　　(2012.01)
　G06Q 20/40　　　(2012.01)
(52) U.S. Cl.
　CPC ............... G06Q 20/38215 (2013.01); G06Q 20/3827 (2013.01); G06Q 20/401 (2013.01); G06Q 2220/00 (2013.01)
(58) Field of Classification Search
　CPC ......... G06Q 20/38215; G06Q 20/3827; G06Q 20/401; G06Q 2220/00
　See application file for complete search history.

(56) References Cited

U.S. PATENT DOCUMENTS

| 12,099,997 | B1 * | 9/2024 | Hoffberg | .............. | G06Q 20/065 |
| 2017/0236120 | A1 * | 8/2017 | Herlihy | ............... | G06Q 20/065 |
| | | | | | 705/67 |

(Continued)

FOREIGN PATENT DOCUMENTS

| CN | 114391241 A | 4/2022 |
| CN | 110264173 B | 7/2022 |
| WO | 2021/018312 A1 | 2/2021 |

OTHER PUBLICATIONS

International Search Report and Written Opinion for International Patent Application No. PCT/US2025/013268, mailed Apr. 4, 2025 (15 pages).

(Continued)

*Primary Examiner* — Kristie D Shingles
(74) *Attorney, Agent, or Firm* — McDermott Will & Schulte LLP

(57)　　　　　　ABSTRACT

Various aspects of the subject technology relate to systems, methods, and machine-readable media for executing transactions in a blockchain network. Various aspects may include receiving one or more transactions issued from an account, the account comprising a bond balance. Aspects may also include partitioning the transactions into a set of validators. Aspects may also include producing, at the set of validators, chunks including the transactions. Aspects may also include replicating the chunks to nodes in the blockchain network. Aspects may also include generating, based on receiving at least a threshold of stake signatures from the nodes, blocks that reference the replicated chunks. Aspects may include distributing, from the bond balance, funds to the nodes for including the replicated chunks in the blocks.

20 Claims, 18 Drawing Sheets

(56) References Cited

U.S. PATENT DOCUMENTS

| | | | |
|---|---|---|---|
| 2019/0354518 A1 | 11/2019 | Zochowski | |
| 2020/0051071 A1 | 2/2020 | Wu et al. | |
| 2020/0279257 A1 | 9/2020 | Cheng et al. | |
| 2021/0073212 A1* | 3/2021 | Conley | H04L 9/3213 |
| 2021/0158443 A1 | 5/2021 | Kilgore et al. | |
| 2021/0224827 A1 | 7/2021 | Goel et al. | |
| 2023/0214832 A1* | 7/2023 | Hu | G06Q 20/401 |
| | | | 705/75 |
| 2025/0106188 A1* | 3/2025 | Siebenbrunner | H04L 63/0428 |

OTHER PUBLICATIONS

Babel, K., et al., Mysticeti: Low-Latency DAG Consensus with Fast Commit Path. Oct. 23, 2023, 15 pages, arXiv:2310.14821v1 [cs.DC], https://doi.org/10.48550/arXiv.2310.14821, Cornell University.
Blackshear, S., et al., Sui Lutris: A Blockchain Combining Broadcast and Consensus. Oct. 27, 2023, 21 pages, arXiv:2310.18042v1 [cs.DC], https://doi.org/10.48550/arXiv.2310.18042, Cornell University.
Danezis, G., et al., Narwhal and Tusk: A DAG-based Mempool and Efficient BFT Consensus. Mar. 16, 2022, 17 pages, arXiv:2105.11827v4 [cs.CR], https://doi.org/10.48550/arXiv.2105.11827, Cornell University. EuroSys '22, Apr. 5-8, 2022, Rennes, France.

Ggol, A., et al., Aleph: Efficient Atomic Broadcast in Asynchronous Networks with Byzantine Nodes. Aug. 29, 2019, 34 pages, arXiv:1908.05156v2 [cs.DC], https://doi.org/10.48550/arXiv.1908.05156, Cornell University.
Hentschel, A., et al., Flow: Separating Consensus and Compute—Block Formation and Execution. Feb. 18, 2020, 41 pages, arXiv:2002.07403v1 [cs.DC], https://doi.org/10.48550/arXiv.2002.07403, Cornell University.
Malkhi, D., et al., BBCA-Chain: One-Message, Low Latency BFT Consensus on a DAG. Oct. 10, 2023, 17 pages, arXiv:2310.06335v1 [cs.DC], https://doi.org/10.48550/arXiv.2310.06335, Cornell University.
Spiegelman, A., et al., Bullshark: DAG BFT Protocols Made Practical. Sep. 7, 2022, 18 pages, arXiv:2201.05677v3 [cs.CR], https://doi.org/10.48550/arXiv.2201.05677, Cornell University. Conference'22, Nov. 2022, Los Angeles, CA, USA.
Spiegelman, A., et al., Shoal: Improving DAG-BFT Latency and Robustness. Jul. 7, 2023, 15 pages, arXiv:2306.03058v2 [cs.DC], https://doi.org/10.48550/arXiv.2306.03058, Cornell University.
Stathakopoulou, C., et al., Mir-BFT: High-Throughput Robust BFT for Decentralized Networks. Jan. 22, 2021, 27 pages, arXiv:1906.05552v3 [cs.DC], https://doi.org/10.48550/arXiv.1906.05552, Cornell University.
Awosika, E., Account Abstraction: Past, Present, Future. Apr. 25, 2023, 36 pages, MetaMask, retrieved on Apr. 28, 2025 from <https://metamask.io/news/account-abstraction-past-present-future>.

* cited by examiner

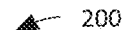
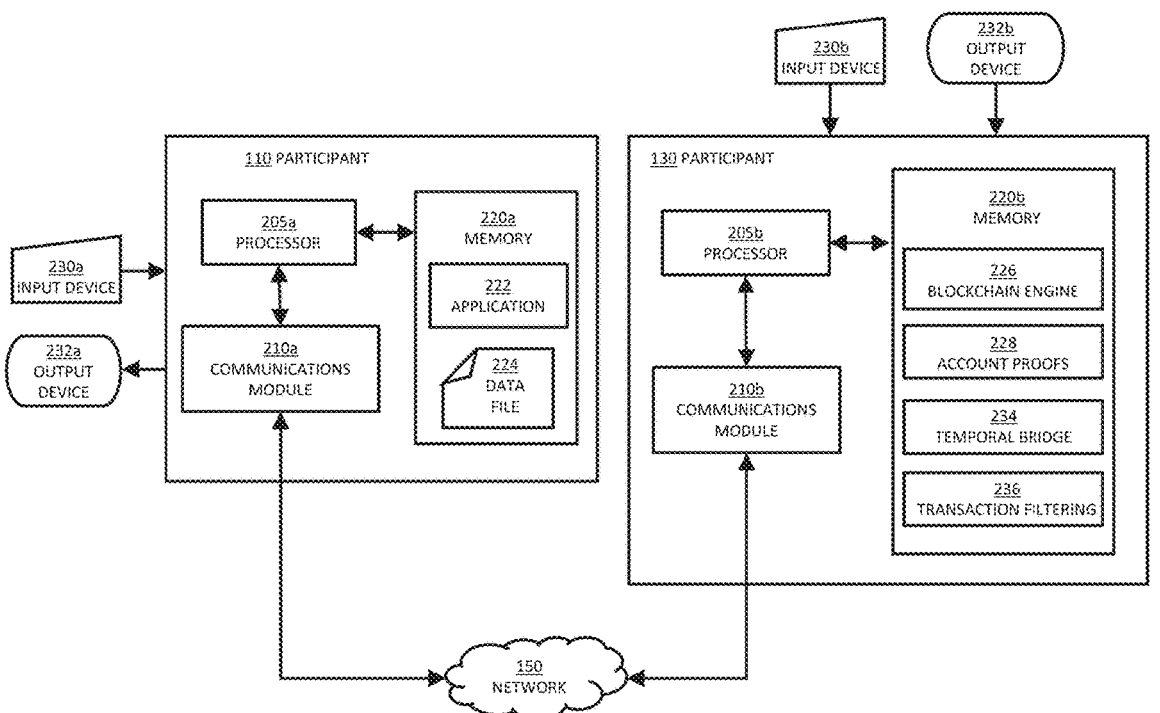
FIG. 2

1400

1500

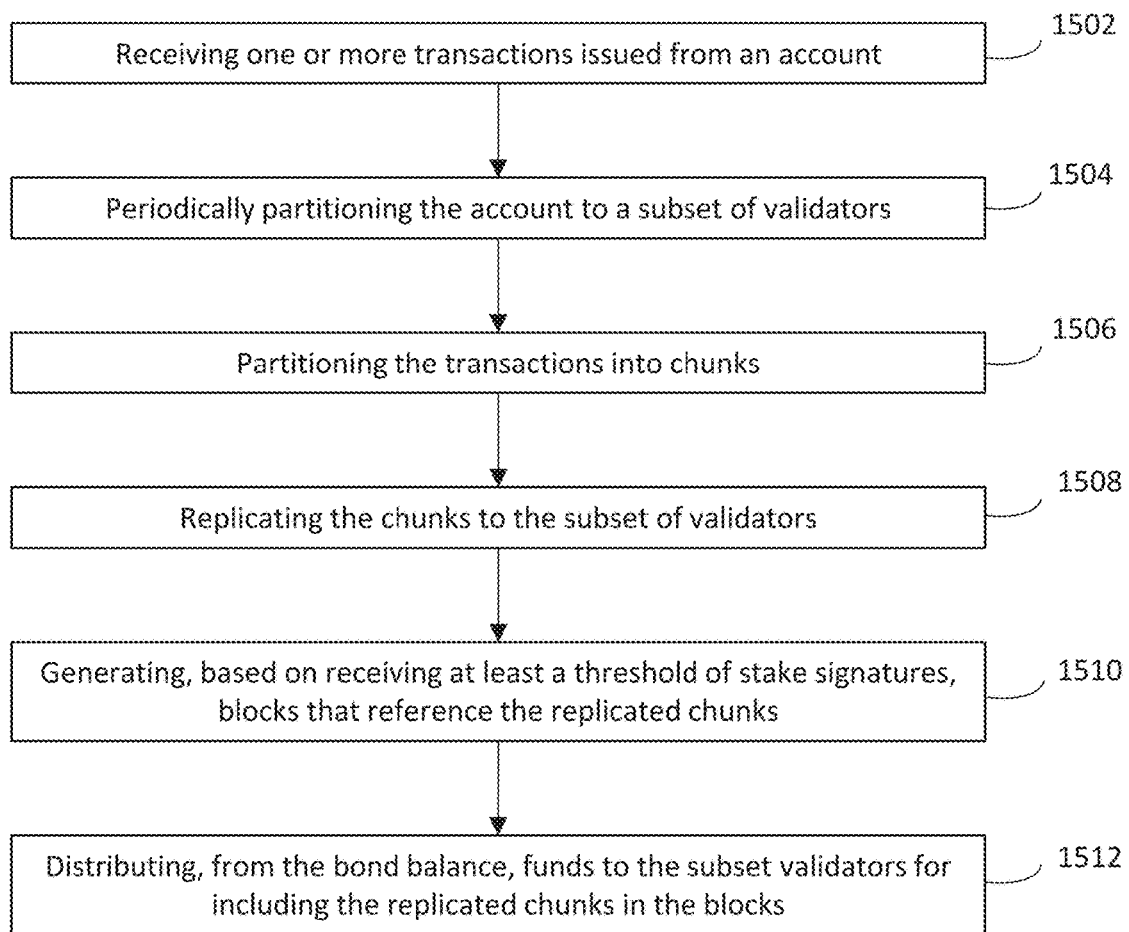

Receiving one or more transactions issued from an account — 1502

Periodically partitioning the account to a subset of validators — 1504

Partitioning the transactions into chunks — 1506

Replicating the chunks to the subset of validators — 1508

Generating, based on receiving at least a threshold of stake signatures, blocks that reference the replicated chunks — 1510

Distributing, from the bond balance, funds to the subset validators for including the replicated chunks in the blocks — 1512

FIG. 15

FORTIFIED DECOUPLED STATE MACHINE REPLICATION

CROSS-REFERENCE TO RELATED APPLICATIONS

The present disclosure is related and claims priority under 35 U.S.C. § 119 (e), to U.S. Provisional Patent Application No. 63/625,117, entitled ROBUST DECOUPLED STATE MACHINE REPLICATION, to Patrick Robert O'Grady, filed on Jan. 25, 2024, the contents of which are hereby incorporated by reference in their entirety, for all purposes.

TECHNICAL FIELD

The present disclosure generally relates to techniques for transaction replication, sequencing, and execution. More specifically, the present disclosure relates to a fortified Decoupled State Machine Replication (DSMR) construction designed to mitigate risks by ensuring that replicated transactions must pay fees, thereby maintaining the robustness of state machine replication and providing a more robust and scalable solution for blockchain application.

BACKGROUND

Conventional blockchain technology includes a growing list of records, called blocks, which are linked together. A blockchain network includes nodes such as a validator node, capable of verifying, voting on, staking and/or maintaining a record of transactions for the blockchain network. The rapid growth of blockchain technology has highlighted the need for scalable and efficient transaction processing mechanisms. Traditional blockchain architectures handle transaction replication, sequencing, and execution simultaneously within each block. The approach often results in limited throughput and increased latency, hindering the scalability of the network. As such, there is a need for enhancing the efficiency, scalability, and security of blockchain networks.

BRIEF SUMMARY

The subject disclosure provides for systems and methods for decoupled state machine replication that implements account fraud proofs, temporal account partitioning, and nonce-less transactions to minimize invalid transactions. According to embodiments, a computer-implemented method transaction execution in a blockchain network is provided. The method includes issuing one or more transactions from an account, the account comprising a bond balance. The method also includes partitioning transactions into validators which produce chunks, each transaction associated with a transaction identification (ID) and an expiry time. The method also includes replicating the chunks to nodes in a blockchain network. The method also includes generating, based on receiving at least a threshold of stake signatures from the nodes, blocks that reference the replicated chunks. The method also includes distributing, from the bond balance, funds to the nodes for including the replicated chunks in the blocks.

According to embodiments, a system is provided including a processor and a memory comprising instructions stored thereon, which when executed by the processor, cause the processor to perform a method for transaction execution in a blockchain network. The method includes issuing one or more transactions from an account, the account comprising a bond balance locked in the account by a user upon creation of the account. The method also includes partitioning transactions into validators which produce chunks, each transaction associated with a transaction ID and an expiry time. The method also includes replicating the chunks to nodes in a blockchain network. The method also includes generating, based on receiving at least a threshold of stake signatures from the nodes, blocks that reference the replicated chunks. The method also includes distributing, from the bond balance, funds to the nodes for including the replicated chunks in the blocks.

According to embodiments, a non-transitory computer-readable storage medium is provided including instructions (e.g., stored sequences of instructions) that, when executed by a processor, cause the processor to perform a process. The process includes receiving one or more transactions from an account, the account comprising a bond balance locked in the account by a user upon creation of the account, and each of the transactions are associated with a transaction ID. The process also includes periodically partitioning the account to a subset of validators in the blockchain network enabled to receive transactions from the account. The process also includes partitioning transactions into the subset of validators based on the account, wherein the subset of validators produce chunks including the transactions. The process also includes replicating the chunks to nodes in the blockchain network. The process also includes generating, based on receiving at least a threshold of stake signatures from the nodes, blocks that reference the replicated chunks. The process also includes distributing, from the bond balance, funds to the nodes for including the replicated chunks in the blocks.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

FIG. 2 is a block diagram illustrating details of devices used in the architecture of FIG. 1, according to some embodiments.

FIG. 15 illustrates an example flow diagram of a process for executing transactions in a blockchain network, according to certain aspects of the present disclosure.

Figure 1:
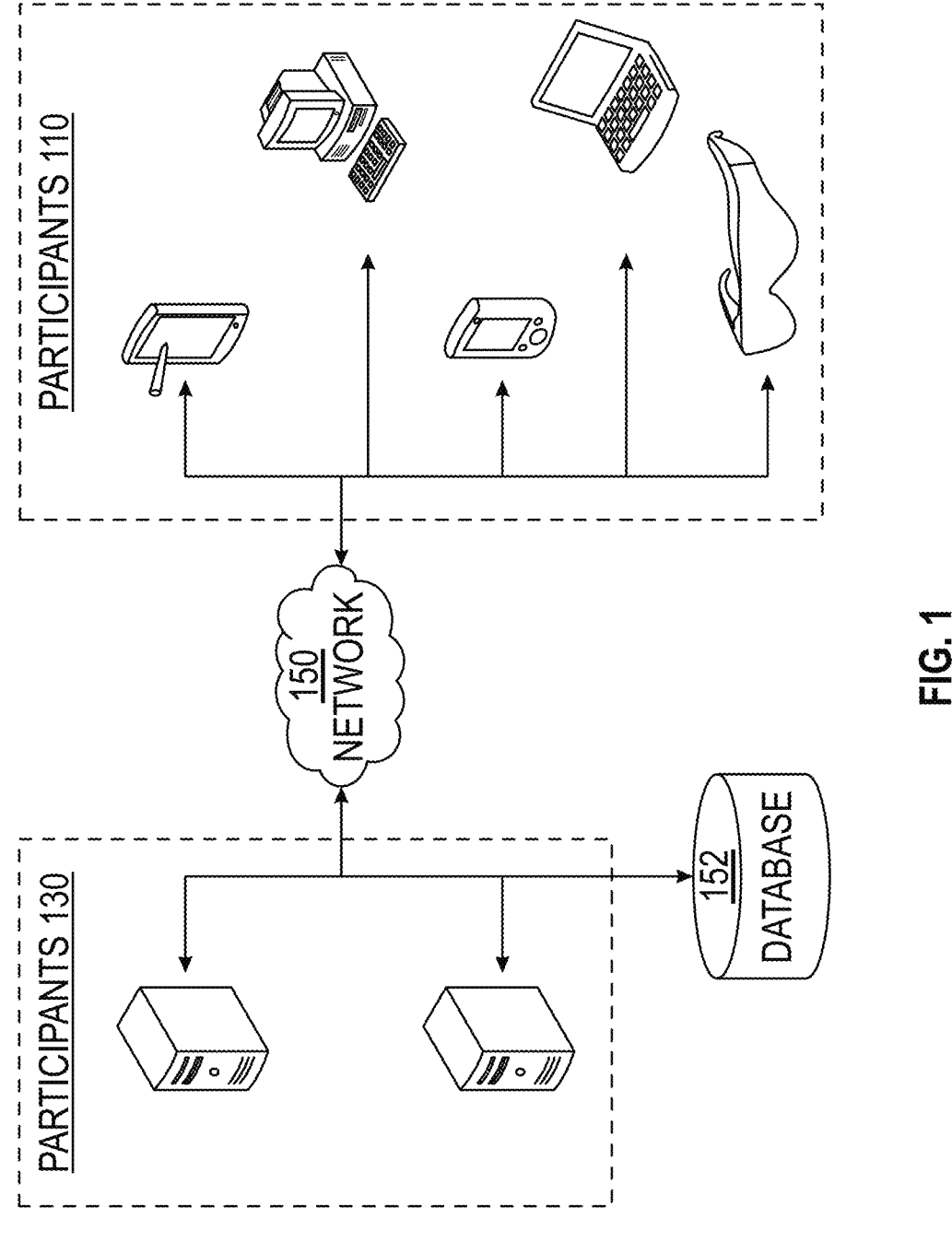
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

State Machine Replication (SMR) is a distributed system concept used to implement fault-tolerant services by replicating servers and coordinating client interactions with server replicas. Implementing SMR in blockchain systems can aid in achieving a balance between consistency, fault tolerance, and performance in blockchains, which are critical aspects of distributed ledger technologies. SMR builds some blocks with a set of transactions in that block. The block will only include syntactically and semantically valid transactions. Further, in traditional SMR (TSMR), validators must wait until a previous block's processing is complete in order to build another block on top of the previous block.

Some of this latency may be mitigated through streaming SMR (SSMR), which introduces some pipelining to the TSMR by breaking each block into chunks. This approach allows block producers to continuously "stream" pieces of blocks (called chunks) as they are built. Other nodes can receive and verify these chunks continuously, even while the rest of the block is still being constructed. Because SSMR has access to the in-progress state of the block as it is broken into chunks and verifiers process the chunks in order, SSMR maintains the constraint that all sequenced transactions are semantically valid. However, if a verifier does not receive a chunk during the streaming broadcast, they may need to fetch it from the builder. This repair process could increase the time required to process blocks.

Decoupling State Machine Replication (DSMR) is designed to overcome bottlenecks in TSMR that limit transaction processing speed (e.g., Transactions Per Second (TPS)). DSMR increases blockchain throughput by independently disseminating, ordering, and verifying transactions. Unlike traditional blockchains where syntactically and semantically valid transactions are sequenced, executed, and replicated simultaneously in each block, DSMR allows for better pipelining of SMR by loosening validity expectations on replicated but not yet sequenced or executed data. Decoupled transaction replication requires the reliable dissemination of transactions to other network participants before full semantic verification can be performed. Semantic verification is not possible because it is unclear how replicated transactions will eventually be sequenced. Therefore, the parent state on which they could be verified is not available.

DSMR allows validators to build and replicate block chunks concurrently by relaxing the requirement for semantic validity of transactions during replication. Unlike TSMR and SSMR, where the phases of SMR are typically (sequence→execute→replicate), this approach reorients the sequence to (replicate→sequence→execute), which is more compatible with horizontally scalable architectures. This new order allows for adding machines to increase transaction replication capacity, independent of state access. Additionally, validators can build new chunks before finishing verification of previous block chunks.

As a consequence of performing replication prior to sequencing and execution, it is no longer possible to enforce semantic verification of replicated transactions. This means that the Fee-Paying Transactions Per Second (fTPS) of DSMR constructions can be far less than the Replicated TPS (rTPS), causing participants to waste valuable resources replicating and verifying invalid transactions (iTPS=rTPS−fTPS). Adversarial issuers (users) employing a mix of cost-effective tactics on a realistic DSMR model can exploit this tradeoff to reduce fTPS to less than 1% of rTPS. As such, there is a need for a model that efficiently achieves higher throughput on blockchains.

Unlike TSMR and SSMR, DSMR cannot semantically verify transactions before or during replication due to the unknown state over which a transaction will be applied. This lack of deterministic ordering means that the number of replicated transactions per second (rTPS) in DSMR may not equal the number of valid, fee-paying transactions (fTPS).

The difference between rTPS and fTPS represents invalid transactions per second (iTPS). While TSMR and SSMR maintain iTPS at zero through semantic validation, DSMR allows for iTPS≥0. Small numbers of invalid transactions are manageable, as nodes can skip them and continue processing. However, the potential for users to significantly increase iTPS (by 10×, 100×, or even 1000×) raises concerns about DSMR's performance in adversarial environments. If 99%+ of rTPS becomes invalid, it questions whether DSMR can achieve its theoretical performance benefits in practice, highlighting a potential vulnerability.

Further, simply applying DSMR to blockchains will leave the blockchain open to potential attacks including, for example, duplicate transactions, conflicting transactions, fund exhaustion, and a combined scenario with conflicting transactions and fund exhaustion.

For example, an attacker may send identical batches of transactions with increasing nonces to all validators, resulting in duplicate transactions. The attacker has sufficient funds to cover fees for all transactions, resulting in the attacker's transactions occupying space in chunks across all validators, but only being executed in a single chunk.

As another example, a transaction issuer may send a unique batch of transactions with monotonically increasing nonces to each validator (i.e., identical transactions/same nonce with different fee prices/payloads), resulting in conflicting transactions. The transaction issuer has enough funds to pay fees for all included transactions. This issuer's transactions will occupy space in the chunks of all validators, but will only be executed in a single chunk.

As another example, a transaction issuer may send a batch of transactions with monotonically increasing nonces to a validator. The first transaction in this batch transfers all of the account's funds to another account controlled by the issuer. While this first transaction in the initial chunk can be executed, it depletes all funds from the account and prevents subsequent transactions in the batch from being executed due to lack of funds to pay fees. The block builder, unaware of this fund exhaustion, continues to include transactions from this account in subsequent chunks.

In some instances, the issuer may combine conflicting transactions with fund exhaustion tactics. Throughput depends on the number of transactions a validator will include from a single account in one block. The issuer may send 10 transactions with unique nonces to a first validator, but only the initial transaction is executable as it depletes all available funds. The same set of transactions is then sent to all other validators in the network. The result is a single valid, executable transaction per block, accompanied by the replication of numerous invalid transactions across the entire network, leading to significant data replication overhead, potential network congestion, and a marked discrepancy between the number of replicated transactions and those that can actually be executed. This causes significant negative effects on the throughput of the entire network.

The inclusion of consensus data within replicated information data can lead to the blockchain persisting enormous amounts of useless data because consensus information requires, for example, hashing payloads and verifying consensus certificates. When a new node joins a blockchain, it must fetch and execute all previously accepted chunks to perform consensus (recall, consensus is usually performed over the artifacts of reliable broadcast of previously replicated data) and generate the current state. While the blockchain plans to offer state sync functionality for nodes that do not need to reprocess all historical transactions (and are willing to accept that the current state is valid if a supermajority of stake does), data providers, explorers, and exchanges still desire to ingest all finalized, valid transactions from genesis onward to offer products and services on the blockchain. When the percentage of iTPS exceeds a threshold (e.g., 99%), this leads to a significant amount of both storage and bandwidth overhead for anyone either serving historical data or receiving it. When the rate of iTPS approaches a threshold (e.g., 99%) of rTPS, nodes need to store/disseminate, for example, a kilobyte of data for every byte of valid/useful data. At such high iTPS rates, nodes may need to store or disseminate a kilobyte of data for every byte of valid or useful information, significantly impacting system efficiency and resource utilization.

The above-described vulnerabilities arise from DSMR's approach of replicating transactions before full semantic verification, highlighting the need for additional security measures when implementing DSMR in blockchain systems.

Additionally, as the blockchain networks gain popularity, users begin to fully utilize available bandwidth with their transactions. To manage this increased demand without requiring hardware upgrades, the community implements a fee-based prioritization system for transaction inclusion. This system adjusts the minimum fee price based on the volume of valid transactions finalized. Initially, this approach seems effective, with fee prices fluctuating in response to network activity. However, this inadvertently incentivizes the previously discussed attack vectors. Some users, who are not time-sensitive about their transactions, find themselves forced to pay higher fees for the same activity they previously conducted at lower costs. These users discover they can exploit the system by saturating the rTPS with invalid transactions using the attack methods mentioned earlier (e.g., duplicate transactions, conflicting transactions, fund exhaustion). This artificial inflation of rTPS causes the minimum fee price to fall, while simultaneously reducing the fTPS. As a result, these users can once again submit their transactions at the lower fee prices they prefer, effectively gaming the system and potentially destabilizing the network's economic model.

Embodiments, as disclosed herein, provide a solution to the above-mentioned problems rooted in computer technology, namely, a fortified DSMR (FDSMR) construction designed to enable honest builders to profit maximize, minimize iTSP, and avoid attacks on blockchain DSMR. Embodiments assume that virtuous builders do not want to waste block space and want to maximize the price people will pay to use the block space. Although non-virtuous (i.e., byzantine) builders can choose to waste block space, blockchain systems assume that there are a limited threshold of byzantine participants. As such, based on this assumption, the FDSMR construction ensures that any time a builder includes a transaction in a block or chunk they are building that any participants included will always pay. This disincentivizes attackers from executing attacks within the blockchain network. The FDSMR may be employed by blockchain systems comprising blockchains and/or subnets, virtual machines (VMs) or the like. The FDSMR empowers profit-maximizing builders (seeking to maximize the amount of fee revenue they collect from transaction inclusion) to ensure data replicated via DSMR has iTPS=0 through the use of account fraud proofs, temporal account partitioning, and nonce-less transactions.

According to embodiments, to protect against builders who opt to replicate data that is invalid, FDSMR also introduces a zero overhead, deterministic filtering mechanism that participants run after execution to remove invalid transactions from the canonical chain to prevent the indefinite persistence and replication of useless data to support new participants joining the network. As a byproduct of this design (and specifically a result of persisting hashes of all filtered data to a chain that can be synced without access to any replicated data), FDSMR also makes it efficient to verifiably sync historical data using cloud-native services instead of from other nodes on the network (whose bandwidth may be better utilized on processing pending transactions).

According to embodiments, FDSMR may be applied in a blockchain framework when building blockchains. In some implementations, FDSMR's approaches may be abstracted into a collection of high-level techniques that other DSMR constructions could add to their own implementations assuming the validator set is known at a particular height, validators have some cryptographic identity (preferably one that is aggregable), and the execution model is account-based.

The disclosed subject technology improves the functioning of the computer itself by alleviating processing load and bandwidth usage on a device, while also optimizing the revenue of block builders. Further, the FDSMR implements operations at the execution layer, is compatible with any underlying decoupled state machine replication construction, and solves for vulnerabilities and attacks inherent to DSMR.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

As used herein, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties.

As used herein, the term "primary network" generally refers to a special subnet, which validates built-in blockchains. Members of the subnets may also be a member of the primary network. In some embodiments, a subject that is a member of the primary network stakes (e.g., acquires or "buys") one or more tokens from the primary network. As a result, blockchain validators can validate built-in blockchains on the primary network and also have staked primary network tokens.

According to aspects, subnets enable the creation of a heterogeneous network of blockchains that can communicate with each other. In embodiments as disclosed herein, numerous validators supporting different blockchains are able to interact with one another. Accordingly, a system as disclosed herein coordinates subnet interactions by learning the source of truth for the blockchain state (the validator set)

and interactions of the blockchain state. In addition, the system incentivizes the subnets to economically sustain the validators.

Although both forks and subnets support a variety of underlying virtual machines (VMs) and their participants, a subnet enables interoperability of different types of virtual machines from the main network (e.g., primary network). On the other hand, forks split the network into isolated historical versions of the main network and make it impossible to maintain the code base and communicate with it. Accordingly, in some embodiments, forking is temporal, whereas subnets are spatial.

Embodiments as disclosed herein include subnets to facilitate the operation and management of customized blockchains by cutting down development time from years to only weeks. The subnets also provide performance isolation, such that performance impacts to one of the subnets may not impact other subnets, as long as they are not communicating with one another. Subnets also allow the creator, miner, or administrator (e.g., user) to limit, manage and assign validators.

In some embodiments, a customized blockchain may include a VM marketplace having subnets serviced by unique VM modules that allow users to create feature sets directed to specific needs. For example, a gaming application in the VM marketplace will have different VM modules than a finance application.

Example Architecture

FIG. 1 is a block diagram of a device operating environment with which aspects of the present disclosure can be implemented. FIG. 1 illustrates an exemplary network architecture 100 to provide a blockchain platform (e.g., blockchain network implementation/deployment platform) for managing blocks and the transfer of messages, according to some embodiments. Blockchains in the blockchain network are validated by (i.e., the state of it is maintained by) a group of nodes. The group of nodes is called a subnet. As such, the blockchain platform includes subnets with corresponding validator sets. The network architecture 100 includes a shared registry of validators made up of all the subnets' validator sets. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks. The blockchain architecture may implement a messaging protocol based on the shared registry of validators. The messaging protocol is designed to facilitate seamless communication between various chains, allowing for the transfer of data and value across different subnets, thereby enhancing the interoperability of the blockchain network.

It is understood that the participants 130 may include the participants 110 as well, such that they are peers. As an example, the participants 130 may include a cloud server or a group of cloud servers. In some implementations, the participants 130 may not be cloud-based servers (i.e., may be implemented outside of a cloud computing environment) or may be partially cloud-based. For example, the participants 110 may include any one of a laptop computer, a desktop computer, or a mobile device such as a smart phone, a palm device, or a tablet device. As an example, the participants 110 may be clients of the blockchain platform for creating, expanding, or otherwise modifying customized blockchain networks and/or private or public subnets. As an example, the participants 110 can function as validators. As an example, the participants 110 may be VMs that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 send messages or issue transactions upon request by the participants 130, such as via a module of the participants 130 at a particular time. The messages may be validated by a validator of the blockchain network.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

Furthermore, features of the blockchain network architecture 100 may improve cross-subnet communication by reducing the processing load/cost associated with leveraging third party validators to verify messages. According to embodiments, cross subnet messaging may be improved by virtue of making transactions faster, more efficient, and more secure and providing reliable native communications between subnets and different blockchains within.

The participants 130 may store data of the existing blockchain in a peer-to-peer (P2P) and/or distributed ledger fashion in a database 152. The database 152 may store relevant information regarding, for example, the shared registry, execution, and verification logic and/or rules for implementing messaging protocols, etc. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc.

FIG. 2 is a block diagram of an example computing network 200 of an example blockchain platform for executing transactions using DSMR. FIG. 2 illustrates a participant (of one or more participants 110) and a server (of one or more participants 130) of the example computing network 200 for use in the network architecture of FIG. 1, according to some embodiments. The blockchain platform of the example computing network 200 may include blockchains represented by the one or more participants 110 and a plurality of platform blockchains validated and secured by a primary subnet (e.g., primary network) and may be represented by the one or more participants 130. A subnet may refer to a dynamic set of validators of the one or more participants 110 working together to achieve consensus on the state of a set of blockchains in the platform.

A subnet of the one or more participants 110/130 may be used to implement protocols according to one or more embodiments. Each of the one or more participants 110 and the one or more participants 130 may access each other and other devices in the network 150 via corresponding communications modules 210a-210b. By non-limiting example, participant 110 may be trying to send a message to participant 130. Participant 130 may reference another participant (not shown), such as a primary platform chain to look up signature keys for validators of participant 110. The communications modules 210a-210b may each include radio hardware and software such as RF antennas, analog circuitry, digital to analog conversion circuits, digital signal processing circuitry, and/or the like. The specific participant 110 and participant 130 depicted in FIGS. 1-2 may each include a processor 205a-205b and memory 220a-220b, respectively. Memories 220a and 220b, and processors 205a and 205b, and communications modules 210a and 210b will be collectively referred to, hereinafter, as "memories 220" and "processors 205" and "communications modules 210." Processor 205a of the participant 110 may be used to operate the participant 110, such as to execute applications and functions thereof rendered on the participant 110. In some embodiments, the participants 110/130 may be operated as a blockchain validator, such as to verify transactions on the existing blockchain. The participant 110 can receive rewards (e.g., cryptocurrency) in exchange for verifying transactions or for participating and staking a network token of the blockchain platform. The participant 110 can be part of a set or list of validators including other validators of the one or more participants 110.

Generally, the participant 110 and the participant 130 include computing devices including at least: the memories 220 storing instructions and processors 205 configured to execute the instructions to perform, at least partially, one or more steps as described in methods according to one or more embodiments. For example, memory 220a of participant 110 may be used to perform functions associated with the blockchain platform hosted by the participant 130, such as functioning as a validator node or VM to maintain the integrity of the existing blockchain, a relayer, and/or other entity. The participant 110 can be one of a plurality of validators (or nodes) that may be organized into a small list of validators for randomly sampling proposers of the next block added to the existing blockchain. A list of the subnet's validators can be extracted by the participant 130 from a designated blockchain platform chain.

Settings of the participant 110 and participant 130 can be defined via user/operator input, such as via an input device 230a and input device 230b (hereafter collectively referenced to as "input device 230"), respectively. Participant 110 and participant 130 may access data or information via an output device 232*a* and output device 232*b* (hereafter collectively referred to as "output device 232"), respectively. The participant 110 can implement the message control described herein based on information stored in the application 222. Data and files associated with the application 222 may be stored in a data file 224 (or, e.g., database 152). The participant 110 may be used by a user of the blockchain platform, such as to perform message transfer, exchange transactions, blockchain validation, block proposal, and other blockchain functions, such as via a graphical user interface (GUI) or display for the user of participant 110. For example, the participant 110 may be coupled to at least one input device 230*a* and output device 232*a* accessible by the user (e.g., for user input and output perceivable by the user). Similarly, for example, the participant 130 may be coupled to at least one input device 230*a* and output device 232*b* accessible by the user. The input device 230 can include a mouse, keyboard, a pointer, a stylus, a touchscreen display, microphone, voice recognition software, GUI, and/or the like. The output device 232 can include a display (e.g., the same touchscreen display as the input device), a speaker, an alarm, and the like.

Memory 220*b* may include a blockchain engine 226, account proofs 228, temporal bridge 234, and transaction filtering 236. The blockchain engine 226 may be configured to create, implement, and maintain blockchains including blockchain protocols (e.g., consensus protocols, messaging protocols, or the like). The account proofs 228 may implement bonds on user accounts such that, if for some reason, the account goes over its account balance (meaning there are no funds left in the account), a block builder can deduct the fee owed by the user from the bond. The temporal bridge 234 may implement a partitioning scheme for user accounts to enable increased concurrent transaction execution. The transaction filtering 236 may produce a filtered hash of transactions that are executable in every block, so that when the chain is re-synced to regenerate the state root, only valid transactions will be synced.

Although the above description describes certain functions being performed by the processor 205*a* of the participant 110 and other certain functions being performed by the processor 205*b* of the participant 130, all of the functions described herein can be performed by the participant 110 and/or the participant 130 in some other alternative division of labor. That is, the processors 205 could perform more or less of the functions described above. In some embodiments, some or part of the participant 110 can be co-located with the participant 130. That is, the participant 130 can be remote from or both the participant 110 and the participant 130 can be part of the same larger computing system, network, or architecture. It is also understood that participant 110 may include message protocol and validation information in its memory 220*a*, and participant 130 may include application information and data files in its memory 220*b*, such that they have parallel structures.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
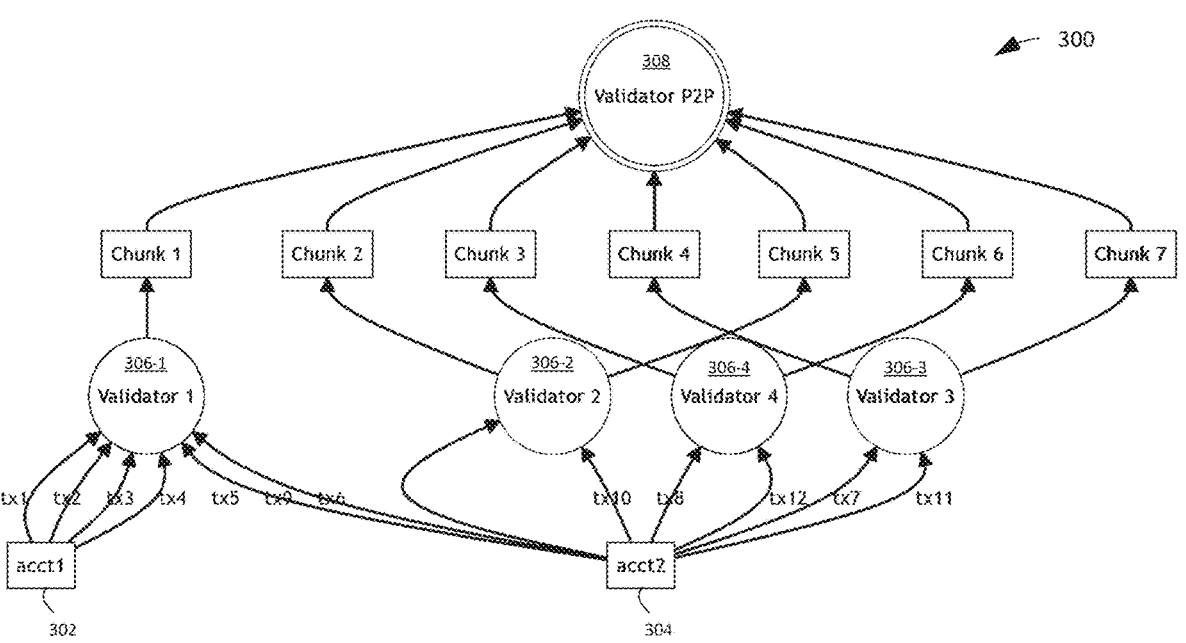
FIGS. 3A-3B are an exemplary transaction issuance framework and chain structure, respectively, in a blockchain network that employs a DSMR construction, according to certain aspects of the present disclosure.

FIG. 3A is an exemplary transaction issuance framework 300 in a blockchain network that employs a realistic DSMR construction. According to embodiments, a first account (acct1) 302 and second account (acct2) 304 may issue transactions (e.g., tx 1-12) in the blockchain by creating and signing them with their private keys. Validators 306-1, 306-2, 306-3, and 306-4 (hereafter validators 306) may be configured to verify that the transactions follow the blockchain network's rules. The blockchain network may be designed according to the following configuration in Table 1.

TABLE 1

| DSMR Blockchain Configuration |
| --- |
| v = 100 (validators) |
| c_i = 1 (chunks/second/validator) |
| c_tx = 1000 (txs/chunk) |
| c_acct = 4 (txs/account/chunk) |
| c_d = 2 (chunk inclusion delay) |
| tx_c = \$0.0001 (cost/tx) |

The blockchain may be designed to following a set of rules including, for example, validators listen for transactions over P2P 308 (no centralized load balancer), validators can include any transaction in a chunk, validators include 1 transaction per account per nonce, only one transaction per account per nonce is executed on-chain, fees only paid for semantically valid transactions, and blocks sequence and execute well-distributed chunks using a black-box consensus.

The following notation may be used to uniquely describe transactions: tx<Transaction ID>(n<Nonce>)[<Action>]. In some embodiments, validators 306 can produce one chunk per second of 1000 transactions and there are 100 validators. This means the maximum rTPS of the blockchain is 100 k. Transactions use nonces to prevent replay and transaction issuers (users) can submit transactions to any connected validator over P2P. Validators can include whatever transactions they want in their chunks (e.g., chunks 1-7) but only one transaction per nonce per account will actually pay fees (if a user replaces a transaction with a higher paying one, both will not be executed). According to embodiments, validators 306 only include four transactions from an account in a single chunk. Transactions have a fixed fee (e.g., \$0.0001) for each transaction.

According to embodiments, chunks that are replicated throughout the blockchain network will be referenced in a block. Blocks randomly order replicated chunks (validators do not know in what order the transactions they replicate will be sequenced), only include a chunk once, and are final once proposed (we assume the existence of some efficient consensus implementation). Chunks take time to be included in a block and validators do not wait for chunk inclusion to replicate another chunk. Therefore, they do not know the result of the transactions they previously replicated before replicating more transactions.

Figure 3B:
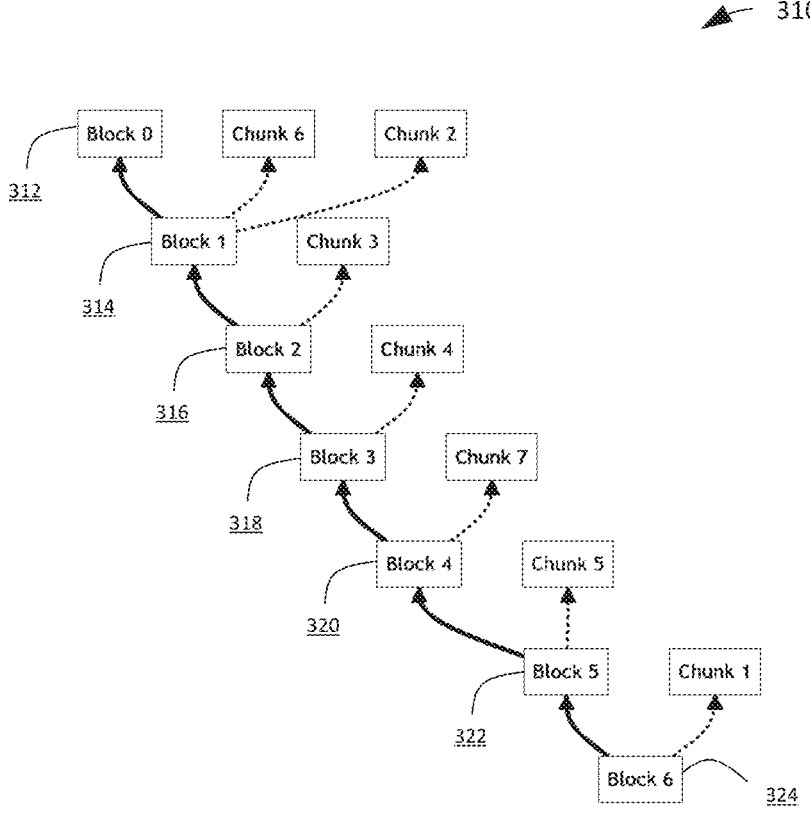

FIG. 3B is an example chain structure 310 for the blockchain network implementing DSMR construction, according to some embodiments. The chain structure 310 includes blocks 312, 314, 316, 318, 320, 322, and 324. Validators 306 may produce one or more chunks for each of the blocks 312, 314, 316, 318, 320, 322, and 324.

Figure 4:
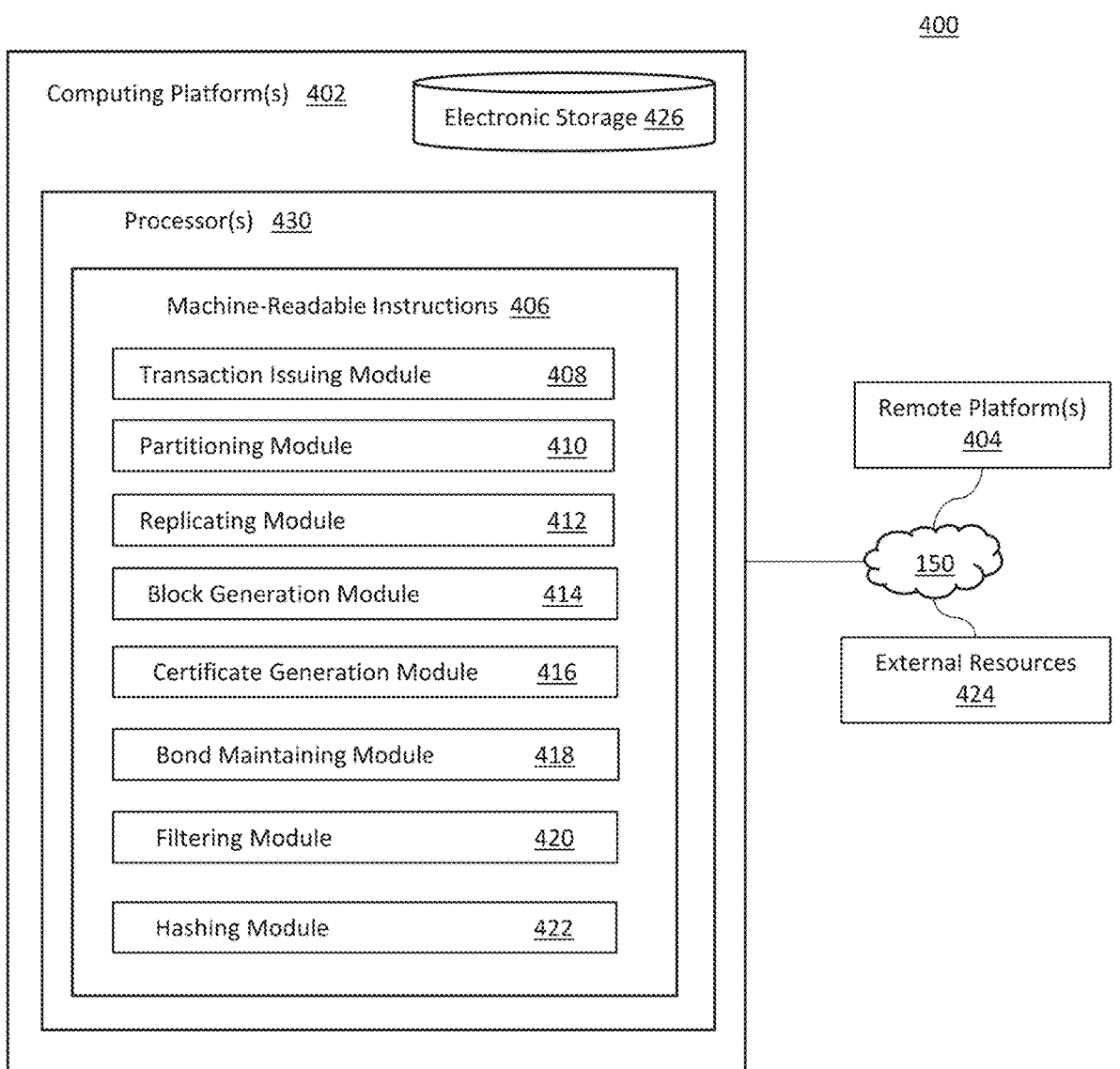
FIG. 4 is a block diagram illustrating a system configured for executing transactions in a Fortified Decoupled State Machine Replication (FDSMR) construction, in accordance with one or more implementations.

FIG. 4 is a block diagram illustrating an example computer system 400 with which aspects of the subject technology can be implemented. The system 400 can be or include a blockchain system/platform for managing blockchains, each of which may be a linear chain of blocks such that each block has a parent block. In some implementations, the system 400 may include one or more computing platforms 402. The computing platform(s) 402 can correspond to a server component of the blockchain platform, which can be similar to or the same as the computing device(s) of participant 130 of FIG. 1 and include the client computing device(s) of participant 110 of FIG. 1 and include the processors 205 in FIG. 2. For example, the computing platform(s) 402 may be configured to execute blockchain transactions.

Computing platform(s) 402 can be configured to implement messaging protocols enabling the transfer of messages from the client computing device(s), consensus protocols, transaction validation mechanisms, etc. The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/or according to a client/server architecture, a peer-to-peer architecture, and/or other architectures.

As an example, the remote platform(s) 404 can include relayers that determine which set of validator nodes are used to sign a transaction. The remote platform(s) 404 can be configured to cause output of the system 400 on client device(s) of the remote platform(s) 404 with enabled access (e.g., based on analysis by the computing platform(s) 402) according to stored data. Any external blockchain platform built based on a platform/metadata chain of the computing platform(s) 402 that relies on the primary blockchain may also realize the benefits of the protocols implemented by a blockchain network comprising the computing platform(s) 402. In this way, the platform chain, primary network, and other entities of the blockchain platform may communicate with the computing platform(s) 402. The computing platform(s) 402, external resources 424, and remote platform(s) 404 may be in communication and/or mutually accessible via the network 150.

The computing platform(s) 402 may be configured by machine-readable instructions 406. The machine-readable instructions 406 may be executed by the computing platform(s) to implement one or more instruction modules. The instruction modules may include computer program modules. The instruction modules being implemented may include one or more of transaction issuing module 408, partitioning module 410, replicating module 412, block generation module 414, certificate generation module 416, bond maintaining module 418, filtering module 420, hashing module 422, and/or other instruction modules.

The transaction issuing module 408 may be configured to issue transactions from an account of a user. The account may include a bond balance locked at the account upon creation of the account. The user may determine the amount of the bond balance according to the number of transactions the user wants to issue at any given time. The bond balance will be used to pay fees (e.g., transaction fees) owed by the user to validators executing a transaction. Accordingly, the bond balance indicates a number of transactions that builders are allowed to have in-flight at a given time by the account. Each transaction may be associated with a transaction identification (ID) and an expiry time. The transaction can no longer be executed after the expiry time.

The partitioning module 410 may be configured to partition transactions into a set of validators. Partitions may be based on user account. For example, a transaction that was issued (by transaction issuing module 408) may be sent to a set of validators that are currently authorized to issue chunks for a partition. The set of validators may then produce chunks containing the provided transaction. According to embodiments, a specified set of validators in the network may be responsible for replicating and executing transactions for the account. The set of validators may comprise valid validators in the blockchain network. Partitions may be set in epochs. The epochs for each set of partitions may overlap in time such that transactions in each partition (or chunk) is set, replicated, and executed in each epoch. The overlapping epochs may have non-overlapping windows for transaction assignment into chunks (i.e., setting new partitions) using expiry times.

According to embodiments, the partitioning module 410 may be configured to sub-partition accounts over a subset of validators. The subset of validators may be allocated for specific accounts where each validator is responsible for chunks in different sub-partitions of the account. The chunks may comprise transactions with different transaction IDs. Partitioning accounts over transaction IDs prevents duplicate transaction issuance in different epochs. The bond maintaining module 418 may divide the bond balance the number of sub-partitions to cover transaction fees for each validator executing its corresponding transactions. In some implementations, transactions are issued in overlapping epochs in sub-partitioned accounts. In this instance, the bond balance may be divided by the number of overlapping epochs and sub-partitions.

The replicating module 412 may be configured to replicate the chunks to validators in the blockchain network. According to some embodiments, builders may listen for transactions (over P2P) issued by accounts allocated to the builders and build chunks with executable transaction. Validators may be configured to validate the chunks and sign the validated chunk.

The block generation module 414 may be configured to generate, based on receiving at least a threshold of stake signatures from the set of validators, blocks that reference the replicated chunks. The block generation module 414 may add the generated block to a chain. Given the overlapping epochs, chunks may be added to a block while another chunk is simultaneously being replicated to validators in the network.

The certificate generation module 416 may be configured to generate chunk certificates based on at least a threshold stake of validators signing the transactions in the chunks, the chunk certificate included in the blocks. According to embodiments, the system 400 may be further configured to perform an aggregating process to generate an aggregate multi-signature from validators that sign a chunk and wait for the threshold stake weight of signatures to be met.

The bond maintaining module 418 may be configured to distribute, from the bond balance, funds to the validators for including the replicated chunks in the blocks. The bond maintaining module 418 may be further configured to determine whether the bond balance of an account is sufficient to cover transaction fees for executing replicated transactions in a chunk and/or epoch. Based on the bond balance being insufficient to cover processing costs (e.g., transaction fees), the system 400 may be configured to freeze the account resulting in a fraud proven account and preventing validators from executing transactions for which accounts cannot pay for. Based on the bond balance being sufficient, funds may be distributed from the bond balance to validators (i.e., block builders) who include the transactions on-chain.

The bond maintaining module 418 may limit in-flight (i.e., issued) transaction by dividing the bond balance by a number of valid validators in the set of validators such that only transactions replicated by the valid validators are executed and added to a block on chain. According to embodiments, the bond maintaining module 418 may divide the bond balance by a number of overlapping epochs to account for the transactions issued in each of the overlapping epochs.

The filtering module 420 may be configured to filter the replicated chunks for valid transactions. The hashing module 422 may be configured to generate hashes for the valid transactions. The hashes may be sequenced in a chain in any order. The hashes may be used by a new node in the blockchain network to sync data for the valid transactions.

In some implementations, the computing platform(s) 402, the remote platform(s) 404, and/or the external resources 424 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 402, the remote platform(s) 404, and/or the external resources 424 may be operatively linked via some other communication media.

A given remote platform 404 may include client computing devices, which may each include one or more processors configured to execute computer program modules. The computer program modules may be configured to enable an expert or user associated with the given remote platform 404 to interface with the system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms. The external resources 424 may include sources of information outside of the system 400, external entities participating with the system 400, and/or other resources. For example, the external resources 424 may include externally designed blockchain elements and/or applications designed by third parties. In some implementations, some or all of the functionality attributed herein to the external resources 424 may be provided by resources included in system 400.

Computing platform(s) 402 may include the electronic storage 426, a processor such as the processors 430, and/or other components. The computing platform(s) 402 may include communication lines, or ports to enable the exchange of information with a network and/or other computing platforms. Illustration of the computing platform(s) 402 in FIG. 4 is not intended to be limiting. The computing platform(s) 402 may include a plurality of hardware, software, and/or firmware components operating together to provide the functionality attributed herein to the computing platform(s) 402. For example, the computing platform(s) 402 may be implemented by a cloud of computing platforms operating together as the computing platform(s) 402.

Electronic storage 426 may include non-transitory storage media that electronically stores information. The electronic storage media of the electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by the processors 430, information received from computing platform(s) 402, information received from the remote platform(s) 404, and/or other information that enables the computing platform(s) 402 to function as described herein.

Processor(s) 430 may be configured to provide information processing capabilities in computing platform(s) 402. As such, processor(s) 430 may include one or more of a digital processor, an analog processor, a digital circuit designed to process information, an analog circuit designed to process information, a state machine, and/or other mechanisms for electronically processing information. Although processor(s) 430 is shown in FIG. 4 as a single entity, this is for illustrative purposes only. In some implementations, processor(s) 430 may include a plurality of processing units. These processing units may be physically located within the same device, or processor(s) 430 may represent processing functionality of a plurality of devices operating in coordination. Processor(s) 430 may be configured to execute modules 408, 410, 412, 414, 416, 418, 420, and/or 422, and/or other modules. Processor(s) 430 may be configured to execute modules 408, 410, 412, 414, 416, 418, 420, and/or 422, and/or other modules by software; hardware; firmware; some combination of software, hardware, and/or firmware; and/or other mechanisms for configuring processing capabilities on processor(s) 430. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, and/or 422 are illustrated in FIG. 4 as being implemented within a single processing unit, in implementations in which processor(s) 430 includes multiple processing units, one or more of modules 408, 410, 412, 414, 416, 418, 420, and/or 422 may be implemented remotely from the other modules. The description of the functionality provided by the different modules 408, 410, 412, 414, 416, 418, 420, and/or 422 described below is for illustrative purposes, and is not intended to be limiting, as any of modules 408, 410, 412, 414, 416, 418, 420, and/or 422 may provide more or less functionality than is described. For example, one or more of modules 408, 410, 412, 414, 416, 418, 420, and/or 422 may be eliminated, and some or all of its functionality may be provided by other ones of modules 408, 410, 412, 414, 416, 418, 420, and/or 422. As another example, processor(s) 430 may be configured to execute one or more additional modules that may perform some or all of the functionality attributed below to one of modules 408, 410, 412, 414, 416, 418, 420, and/or 422.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
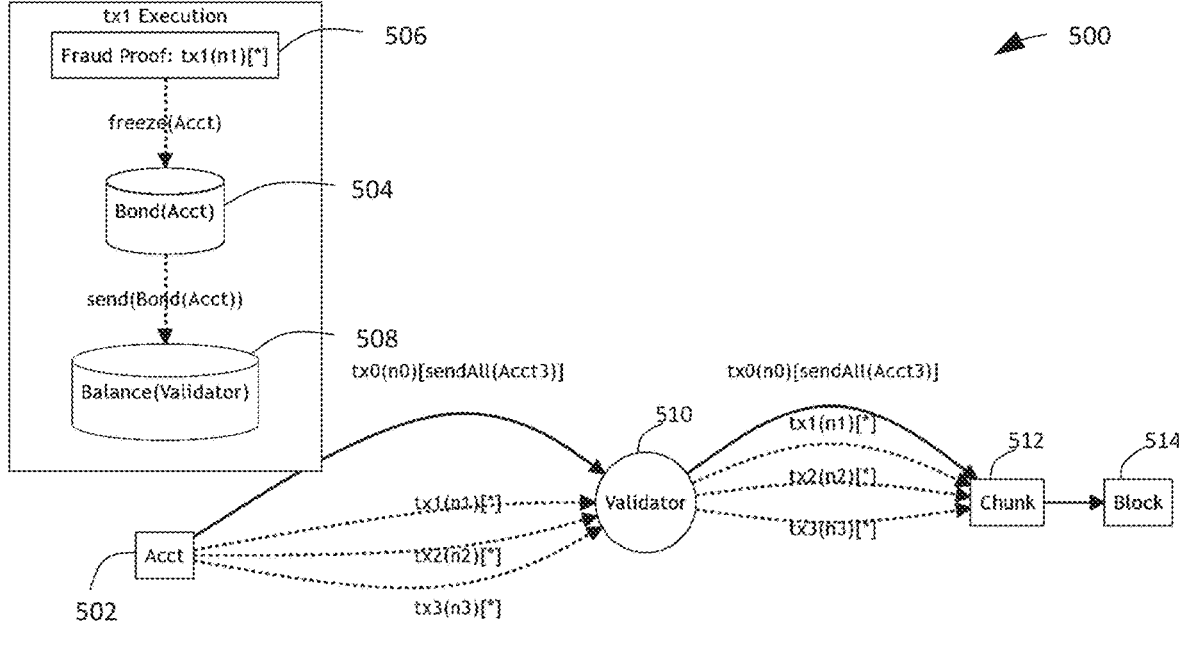
FIG. 5 is an exemplary account fraud proofs implementation in a transaction execution using FDSMR blockchain, according to certain aspects of the present disclosure.

FIG. 5 is an exemplary account fraud proofs implementation in a transaction execution 500 using FDSMR blockchain, according to aspects of embodiments. Aspects of FIG. 5 may be implemented and/or executed by, e.g., account proofs 228 or one or more other modules. According to embodiments, to ensure any transaction replicated by a profit-maximizing builder pays fees, FDSMR introduces a notion of claimable bonds using account fraud proofs. The asterisk symbol shown in FIG. 5 indicates that the field may include any value.

According to embodiments, when an account 502 is created, a corresponding bond 504 is created. The amount of the bond 504 determines how many concurrent transactions a user of the account 502 can issue at once. The user may set the bond amount upon creating the account. In some embodiments, the user may update the bond amount at a later time. In FDSMR, the bond 504 includes funds that are locked up (upon creation) that can be claimed by any builder that replicates a transaction that the account 502 cannot pay fees for. The act of including a valid transaction other than not having sufficient funds to pay fees in replicated data serves as a fraud proof 506.

According to embodiments, any account (user) has full visibility of their issued transactions and can ensure that they have funds to cover the execution of all transactions they broadcast. The size of the bond 504 locked by each account determines how many transactions builders allow to be in-flight, as the funds an account has to pay fees could be exhausted at any point and they will rely on the bond to cover their loss.

According to embodiments, the account 502 does not need to top up their bond 504 unless they want to increase the number of transactions they can issue at any time, and thus avoid a tedious user experience impairment. Accordingly, the bond 504 amount is set once at creation and should never be used unless the account balance is exhausted. The user of account 502 inherently has full control over when the bond 504 is used (e.g., by not issuing transactions that overspend their balance). The bond 504 may be used to update balance 508 of validator 510 which may replicate the transactions into chunk(s) 512 and references by a block 514, completing execution of the transaction.

According to embodiments, if an account 502 cannot pay the fees for a replicated transaction, the account becomes locked and part of the bond 504 is distributed to any builder that included their transaction. This prevents malicious users from issuing invalid or non-executable transactions because the builder is able to collect their owed funds from the users' bonds. According to embodiments, when an account is originally created, another account may fund a frozen account so that the account can submit transactions again.

The fraud proof 506 is embedded in the initiation of a transaction on-chain. By non-limiting example, if the bond 504 can cover five transactions (i.e., fees processing the transactions) and the account 502 has no balance to pay the transactions, when execution of the transactions eventually occurs, the state of the transaction will indicate that the user cannot pay the transaction that is trying to be executed in the sequence. Any transactions that cannot pay fees are used as fraud proofs to claim an account's previously locked and non-withdrawable bond. The user, having full knowledge of their balance, attempted to issue transactions they cannot cover. Therefore, the account is fraud proven and frozen, preventing the user from issuing any further transactions until the account balance is replenished (by the user or another user/account). As long as profit maximizing builders do not replicate transactions that pay more fees than an account's bond covers, they will always receive at least the amount of fees that the transactions would have paid if valid. As such, for example, a VM, via its canonical transaction format, does not need to indicate the full amount an account could spend of the native token if included.

According to embodiments, transactions that were never executed nor used as an account fraud proof are eventually dropped from all nodes. New nodes syncing in the blockchain will only need to fetch and execute valid transactions, which means that the amount of data that needs to be persisted and served by nodes is only a fraction of what it would be without the FDSMR construction (even if all builders were not profit-maximizing).

According to embodiments, accounts that are fraud proven are not deleted. Fraud proven accounts may hold assets of value far greater than their bond and the root cause of invalid issuance may have been an honest mistake. To prevent premature deletion of the account, fraud proven accounts may not be deleted. Rather, they are frozen.

According to embodiments, once bonded, an account cannot withdraw their funds as builders rely on the locked nature of these funds (and a delayed view of them during replication) to justify their inclusion of transactions before they know they will be compensated for such work. According to some embodiments, the FDSMR may include a mechanism that allows a user to gracefully terminate the usage of their account, allowing the user to retrieve their bond. By non-limiting example, a certain transaction may be used to mark the account as closed, and then once the sufficient number of epochs have passed such that any chunk producer is guaranteed to have seen that the account was closed, the FDSMR system may return the bond to the user. This recovers the bond from the account for the user.

Figure 6:
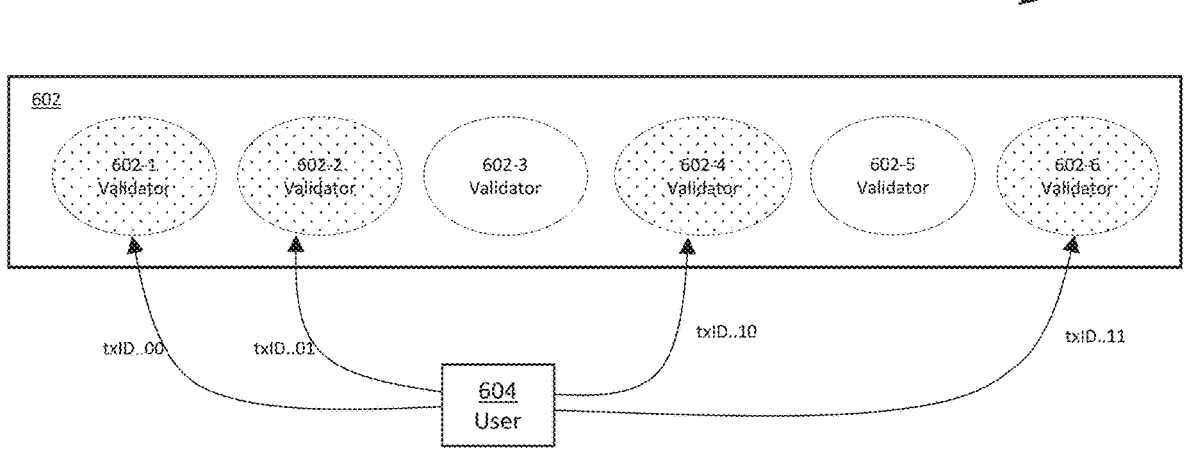
FIG. 6 illustrates a temporal account partitioning and nonce-less transaction implementations in FDSMR, according to certain aspects of the present disclosure.

FIG. 6 illustrates a temporal account partitioning and nonce-less transaction 600 implementations in FDSMR, according to aspects of embodiments. Aspects of FIGS. 6 and 8 may be implemented and/or executed by, for example, temporal bridge 234 and/or one or more other modules. The temporal account partitioning and nonce-less transactions enable builders to track the liabilities of any account (number of in-flight transactions) by partitioning transactions by account to specific builders.

According to embodiments, user accounts are periodically partitioned to one or more different validators in a set of validators 602. As shown in FIG. 6, the user account 604 is partitioned to validators 602-1, 602-2, 602-4 and 602-6 (and not validators 602-3 and 602-5). A predetermined and configurable number of validators allowed to distribute transactions from an account may be specified when a blockchain is created. The bond associated with the account may be divided by the number of validators allowed to distribute transactions. By allocating a subset of validators in the network (rather than enabling all validators to replicate the chunks), users may have more transactions in flight with the same size bond. According to embodiments, each transaction may specify an expiry time after which it can no longer be executed.

According to some embodiments, FDSMR can optionally be configured to further sub-partition each account over validators to provide additional censorship resistance and better load balancing for active accounts. In this parameterization, the account bond (e.g., bond 504) may be divided by all valid builders when limiting in-flight transactions. Only transactions replicated by correct builders will be executed. As such, profit maximizing builders do not need to fear that other builders can cause them to replicate invalid transactions if they were to include arbitrary transactions. This can be extended to be more robust against censoring builders. Specifically, transactions replicated by correct builders can be preferred over transactions replicated by other builders. This is useful, for example, if the validators in the partition that is producing chunks for an account are offline or otherwise not producing chunks as expected.

Re-partitioning accounts over builders is important for providing censorship resistance (even when sub-partitioned, it may not be possible to issue some transactions) and for staking set rotations (e.g., when builders are either evicted and can no longer replicate transactions or are added and can now replicate transactions).

Given every transaction is uniquely identified by its transaction ID, the notion of nonce-less transactions are introduced for the account-based blockchain where replay protection is provided by the transaction ID over some expiry window. Because FDSMR partitions transactions by account to different builders (and can even sub-partition transactions within an account), it is not optimal for two profit-maximizing builders to include the same transaction (as only one will be executed). Issuing the same transaction to all builders will result in the transaction getting dropped on all but one profit-maximizing builder.

In some implementations, if a transaction is included by a non-compliant builder that was not partitioned to issue the transaction, it will be skipped during execution. Therefore, the only way to get a transaction replicated by more than one profit-maximizing builder is to issue multiple transactions, which all pay fees or are fraud proven. Meaning, in any implementation of the FDSMR, the chain will ensure there is no duplicate transaction ID executed over a period of time (or epoch). The account bonds, account partitioning, and transaction relay protection provided by the transaction ID and expiry window, prevents users from creating multiple objects where only one can be executed.

With nonce-less transactions, there is no way for a user (malicious or not) to issue conflicting transactions to different builders responsible for different sub-partitions of an account. Because FDSMR transactions do not have nonces and cannot be made to conflict, such that only one of a set will be executed even if an account has sufficient funds to pay for all executions, conflicting transactions are not possible by construction.

Figure 7:
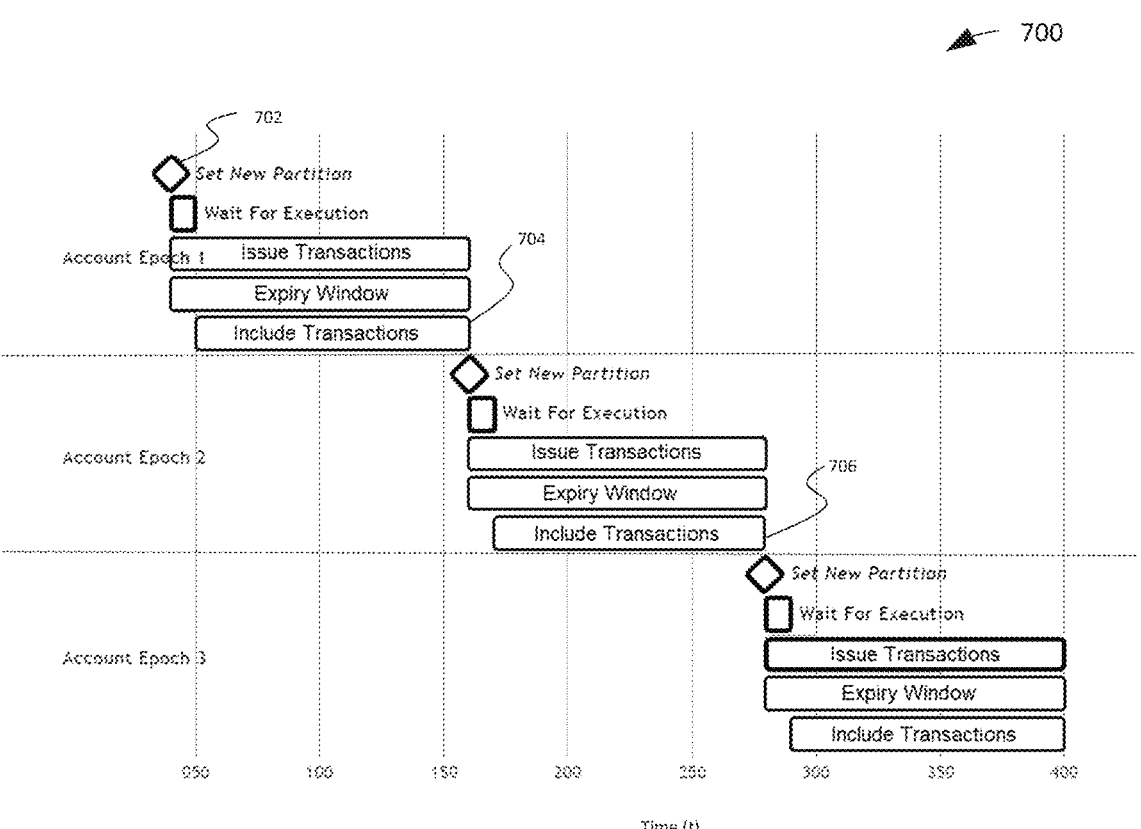
FIG. 7 is an exemplary temporal graph of non-overlapping account epochs, according to certain aspects of the present disclosure.

According to embodiments, the nonce-less transactions also make re-partition operations on accounts more efficient. Re-partitioning by setting non-overlapping epochs where transactions are assigned to specific builders based on their expiry window is not particularly efficient. FIG. 7 is an exemplary temporal graph 700 of non-overlapping account epochs. As shown in FIG. 7, this approach requires builders to wait for the execution of previous partitions to complete before new transactions from the next partition can be replicated. Waiting allows builders to ensure that, for example, there are no outstanding transactions that have not been executed and accounts do not overspend their bond. For example, transactions from partition 702 must complete before transactions from partition 704 can begin replicating, and similarly for partition 706.

Figure 8A:
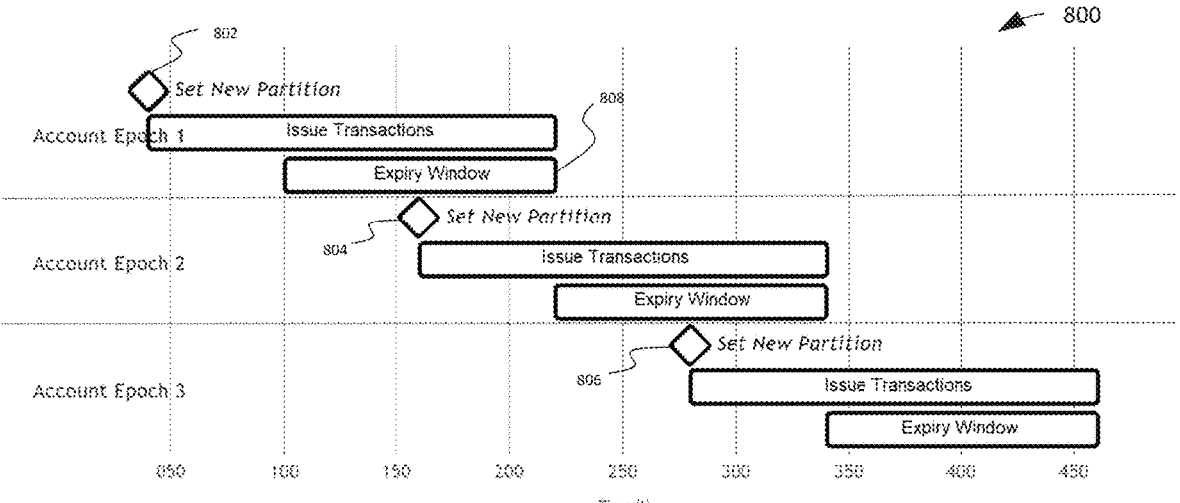
FIGS. 8A-8B illustrate example transaction execution temporal graphs using FDSMR, according to certain aspects of the present disclosure.
Figure 8B:
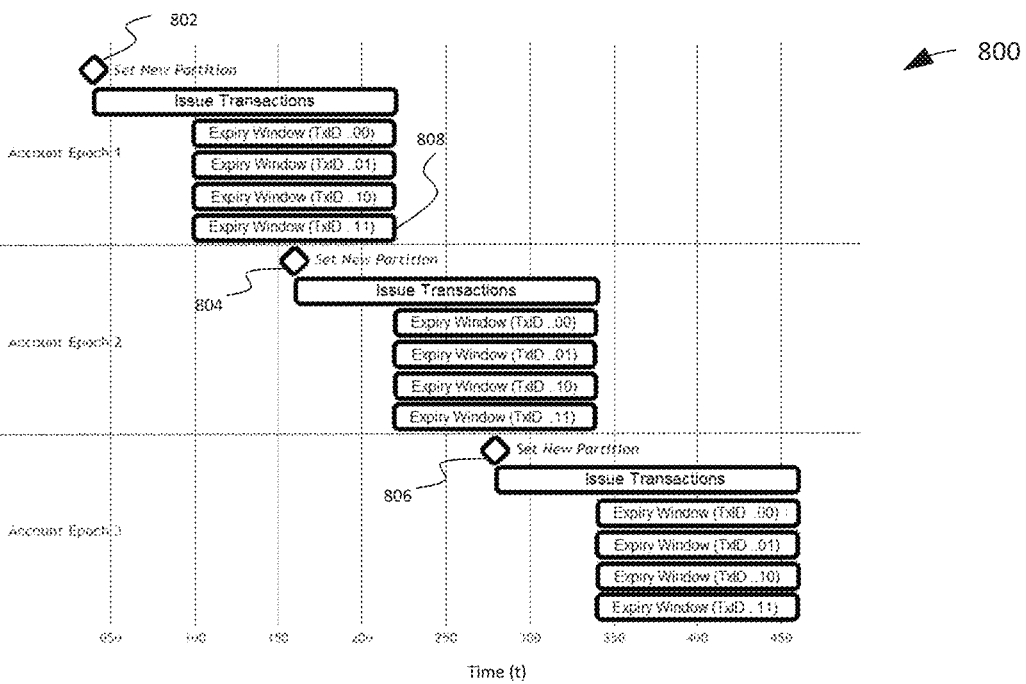

FIGS. 8A-8B illustrate example transaction execution temporal graphs 800 using FDSMR, according to aspects of embodiments. FIG. 8A illustrates an example where each partition includes one transaction in flight and FIG. 8B illustrates an example where each partition includes four transactions in flight. This approach allows users to safely issue transactions into a future epoch, increasing the number of transactions that can be processed concurrently (or semi-concurrently).

According to embodiments, issuance of transactions into partitions are allowed to overlap and the account bond is split over the overlapping epochs (e.g., dividing the bond by two). With this approach, the FDSMR construction can avoid the issue of builders needing to wait for previous epochs to finalize to continue replicating newly issued transactions.

According to embodiments, the partitions themselves overlap, which allows the same transaction to be issued into different epochs and likely to different builders, which allows issuance into a future epoch while an existing epoch is ongoing. As shown in FIG. 8A, the new partition 804 is set in the account epoch 2 prior to the completion of partition 802 and corresponding expiry window 808. Similarly, the partition 806 is set in account epoch 3 while the issuance of transactions in partition 804 are ongoing.

According to embodiments, the accounts may be sub-partitioned based on transaction ID. If the account-transaction ID space is further partitioned, the bond may be divided by the number of partitions created. Bonds may be broken up according to the following equation:

$$\text{bond}/(2 * (\text{Number of Sub-Partitions})) \quad \text{(Equation 1)}$$

The bond (in Equation 1) is divided by two, one of the two divided portions of the bond covering a previous and the other covering a next overlapping epoch (e.g., account epoch 1 and account epoch 2 in FIG. 8A) and the number of sub-partitions represents the number of sub-partitions the user wants to allow, providing censorship resistance.

Each sub-partition has a limit on how many transactions it will include in flight in a given epoch. In some embodiments, each transaction may specify which sub-partition the transaction will go into. The user issuing the transaction may set the sub-partition the transaction will be assigned to. In some implementations, the user is allowed to dynamically set the number of sub-partitions. In some embodiments, a set of transactions may be equally spread across partitions. This continues to maintain the invariant that any transaction replicated by a profit-maximizing builder will pay fees or the bond associated with the issuer will. This assumes that that the number of transactions outstanding (which is limited by the builder) pays fees less than or equal to the partition of the bond potentially owed to the builder.

According to some embodiments, the account bond may be split over any two account epochs at a given time. This means that if there is a fault during either epoch, future builders to which the frozen account is assigned must be able to witness this fault before they begin replicating transactions for the account. In the worst case, the time to update state and witness such a fault should be the duration of half an epoch (assuming the fault occurs in the latter of the active epochs). This should be considered when employing FDSMR and parameterizing the construction.

Figure 9:
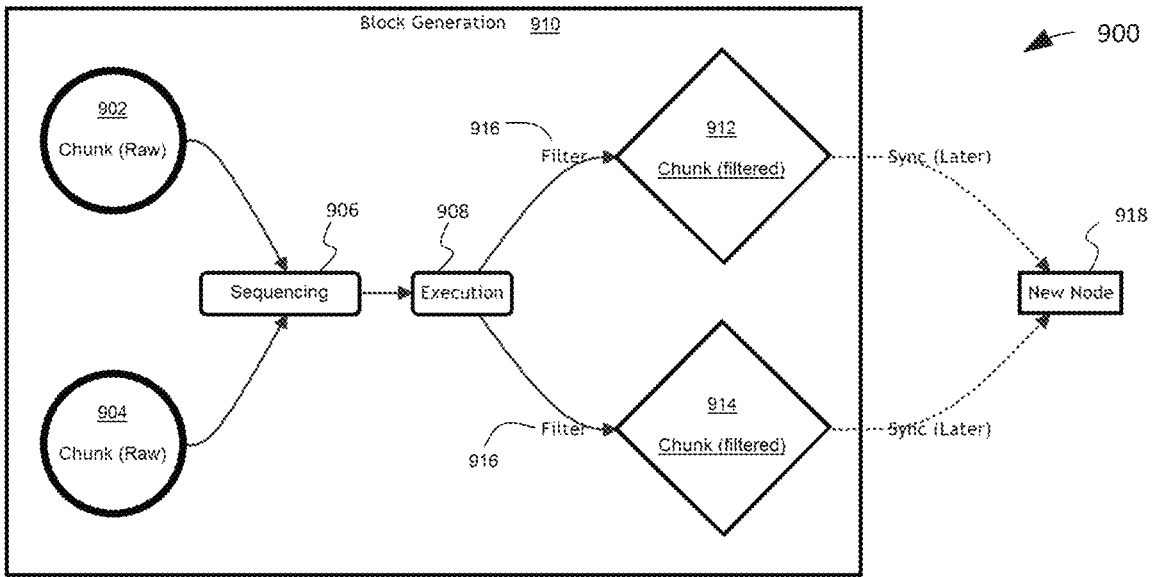
FIG. 9 is a post-execution transaction filtering mechanism in FDSMR, according to certain aspects of the present disclosure.

FIG. 9 is a post-execution transaction filtering mechanism 900 in FDSMR, according to aspects of embodiments. Aspects of FIG. 9 may be implemented and/or executed by, for example, transaction filtering 236 and/or one or more other modules. The post-execution transaction filtering 912 may be implemented during block generation 910. According to embodiments, the post-execution transaction filtering mechanism may produce, in every block, a filtered hash for transactions that are executable. Chunk 902 and chunk 904 may include raw transaction data. Sequencing 906 may be configured to sequence the chunks (e.g., using random sequencing techniques). Execution 908 may execute the transaction in the sequenced chunks. Executing the transaction may include processing, validating, replicating, and including the transaction in a block on the blockchain. The transaction filtering 916 may produce a filtered chunk 912 and filtered chunk 914 from the executed transactions in raw chunk 902 and raw chunk 904, respectively. The filtered chunks 912 and 914 may only include valid, fee-paying transactions. This ensures that the weight of non-compliant builders does not affect the stability or efficiency of the system. Any node can then generate deterministic hashes of the filtered chunks (i.e., chunk 912 and chunk 914) and use the hashes to sync at a later time, which can be used to sync nodes (e.g., new node 918) at a later time. For example, new node 918 can use hashes of filtered chunk 912 and filtered chunk 914 to sync to the chain and will only be served fee paying transactions.

This approach also allows for creating, for example, an external chain of replicated data hashes that nodes can sync prior to fetching replicated data. This ensures data fetched is filtered and allows it to be verifiably fetched from external services (e.g., cloud-native services), rather than from other nodes on the network, dramatically easing the burden on validators to help new nodes join the network.

Even if constraints are added to replication and execution to enable builders to employ profit maximizing heuristics that ensure all transactions that they replicate pay fees, not all builders are guaranteed to follow them and may still replicate invalid transactions. FDSMR ensures that even in this case, the replication remains robust by introducing a deterministic filtering mechanism run during block execution that transforms all replicated chunks into filtered counterparts that only contain valid transactions. A valid transaction may be any transaction which run out of user funds (e.g., fraud proofs, bond revocation, account freezing). As such, the deterministic filtering mechanism is configured to only filter transactions that a correct builder would have never included. All participants can perform the same transaction filtering during execution and thus produce the same filtered replicated data, so there is no need to re-replicate cleaned data. This ensures that participants on the network only need to persist and serve valid transactions for an extended period of time.

Figure 10:
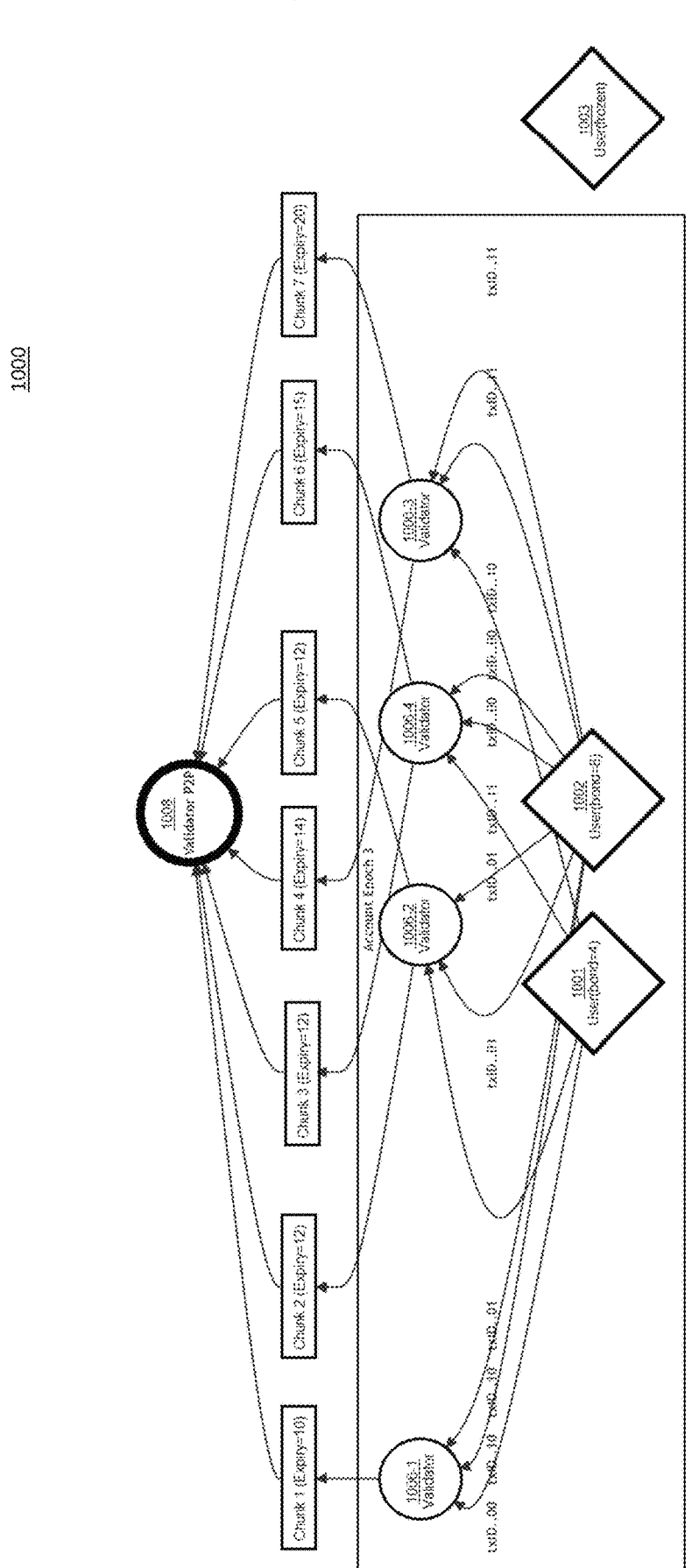
FIG. 10 is an exemplary partitioned transaction issuance framework in a blockchain network that employs an FDSMR construction, according to certain aspects of the present disclosure.

FIG. 10 is an exemplary partitioned transaction issuance framework 1000 in a blockchain network that employs an FDSMR construction. According to embodiments, builders listen for transactions over a validator P2P network 1008 from user 1001 and user 1002 that are partitioned to them and bundle syntactically valid transactions into chunk 1, chunk 2, chunk 3, chunk 4, chunk 5, chunk 6, and chunk 7. As shown in FIG. 10, transactions from user 1001 and user 1002 may be partitioned to validators 1006-1, 1006-2, 1006-3 and 1006-4.

According to some embodiments, validators may emit a configurable number of chunks per second. The number of chunks per second may be limited by the expiry time for the transactions. A beneficiary of the chunk may correspond to an address that will receive a portion of the fee revenue from the chunk, if the chunk is included in the chain. The address may be used as the recipient of any account bond distributions. A signer is included in the chunk so that recipients can generate a chunk fault if a builder sends conflicting chunks. The chunk fault may be posted when a builder signs conflicting chunks, penalizing malicious builders for subverting replication.

An account of user 1003 may be frozen because their balance cannot afford to issue transactions, and thus the validators do not listen for transactions from the user 1003, excluding them from the epoch. The builders then send the chunks to other validators and accumulate BLS signatures from the validators acknowledging that they persisted each chunk. That is, upon receiving a chunk, validators will persist it, sign it, and send the signature back to the builder.

According to some embodiments, as soon as a validator collects signatures from validators having a threshold percentage of stake, a chunk certificate can be created and included in a block by any builder. If a validator sends more than the allowed number of chunks per second, validators will only sign the first they receive. The signature is then aggregated in chunk certificates when queueing a chunk to be executed in a block.

Builders may be incentivized to distribute data to and collect more than the minimum attestation weight (i.e., threshold percentage of stake) before issuing a chunk certificate because the fees they collect from sequenced chunks scales based on the percentage of stake included in the chunk certificate broadcast. Therefore, it may be that the fee issued to the beneficiary is proportional to the stake weight that signs the chunk. If some validators are unwilling to sign a broadcasted chunk, builders can retaliate by not signing their chunks. In some implementations, the FDSMR construction may only require that a chunk is sufficiently distributed to be able to be quickly fetched.

According to some embodiments, executed chunks only contain transactions that were executed in a block and its hash is the canonical hash used for long-term persistence. An array of bits indicating whether included messages were verified may be included in the hashed chunk data. This prevents nodes from needing to re-verify the multi-signatures when bootstrapping (and fetching historical validator sets). Nodes can fetch either available chunks with chunk certificates with at least the threshold of stake signatures or executed chunks near the processing tip of the chain. According to some embodiments, after a configurable period of time, nodes can only fetch executed chunks. The inclusion of executed chunks in blocks allows nodes to compile a list of chunks to fetch to generate the current state and then verifiably fetch them from external services.

Figure 11:
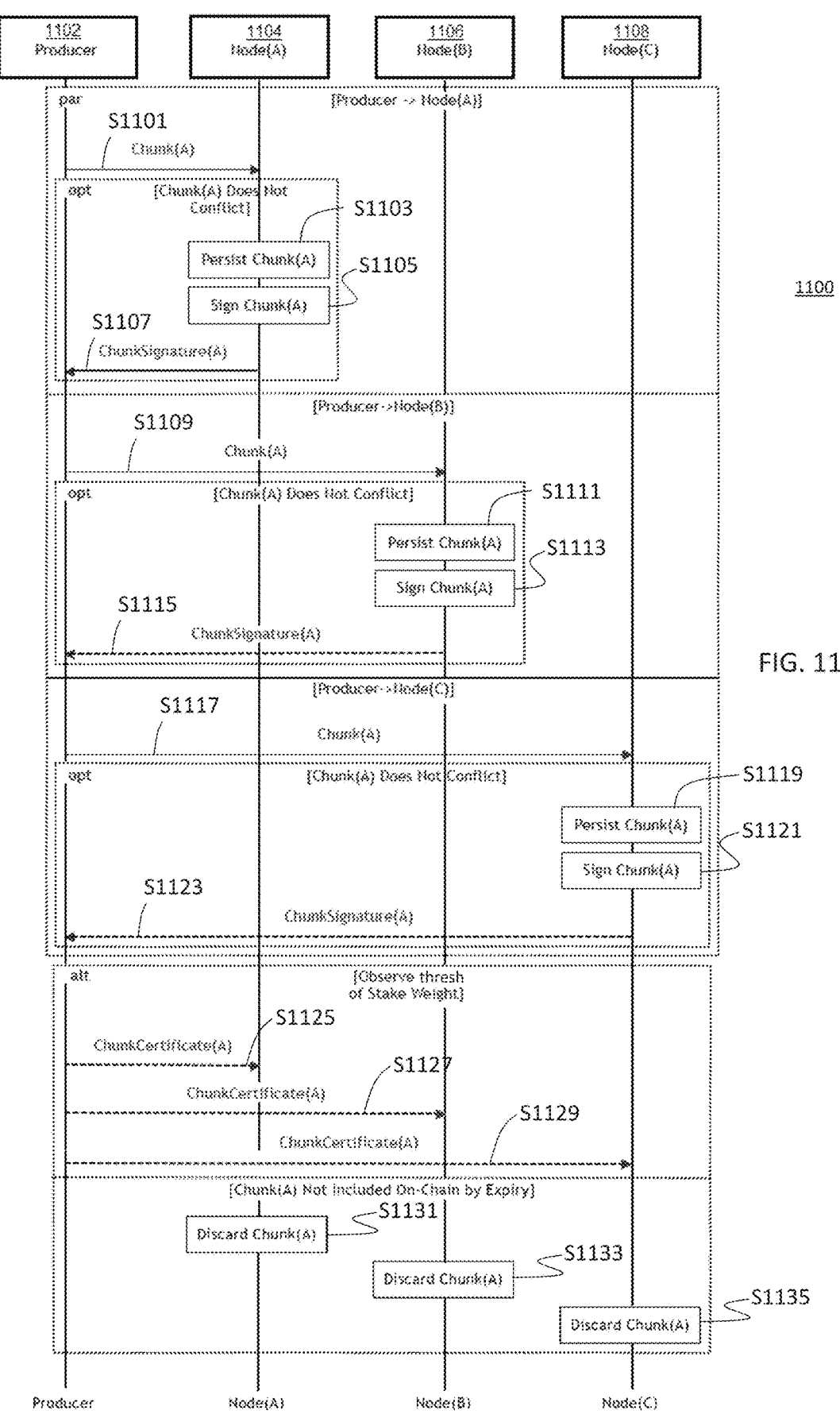
FIG. 11 is an exemplary chunk distribution workflow, according to certain aspects of the present disclosure.

FIG. 11 is an exemplary chunk distribution workflow 1100, according to one or more embodiments. At S1101, a producer (or builder) 1102 sends a chunk A to node 1104. The chunk may include, for example, data indicating the producer of the chunk, expiry time, beneficiary, transaction, signer, and signature.

At S1103, the node 1104 persists the chunk A and, at S1105, the node 1104 will sign the chunk A. At S1107, the signature is sent to the producer 1102. Similarly, at S1109, the producer 1102 sends the chunk A to node 1106. At S1111, the node 1106 persists the chunk A and, at S1113, the node 1106 will sign the chunk A. At S1115, the signature is sent to the producer 1102. Similarly, at S1117, the producer 1102 sends the chunk A to node 1108. At S1119, the node 1108 persists the chunk A and, at S1121, the node 1108 will sign the chunk A. At S1123, the signature is sent to the producer 1102.

This process continues with one or more of the nodes in the network until the producer observes a threshold (thresh) of stake-weighted signatures. If the producer has not received the threshold stake weight of signatures, the producer may fetch available chunks (if it has not already). When the threshold is met, a chunk certificate is issued to each signing node. At S1125, S1127, and S1129 the chunk certificate is created and broadcasted to the node 1104, node

1106, and node 1108, respectively. Chunk certificates from all the validators are included in a block and included on-chain.

According to embodiments, a block corresponding to the chunk is only included on-chain if the threshold is met by the expiry time of the corresponding chunk. In some embodiments, if the threshold is not met by the expiry time, the chunk may be discarded from the node. At S1131, S1133, and S1135 the chunk is discarded from the node 1104, node 1106, and node 1108, respectively, after the expiry time.

Figure 12:
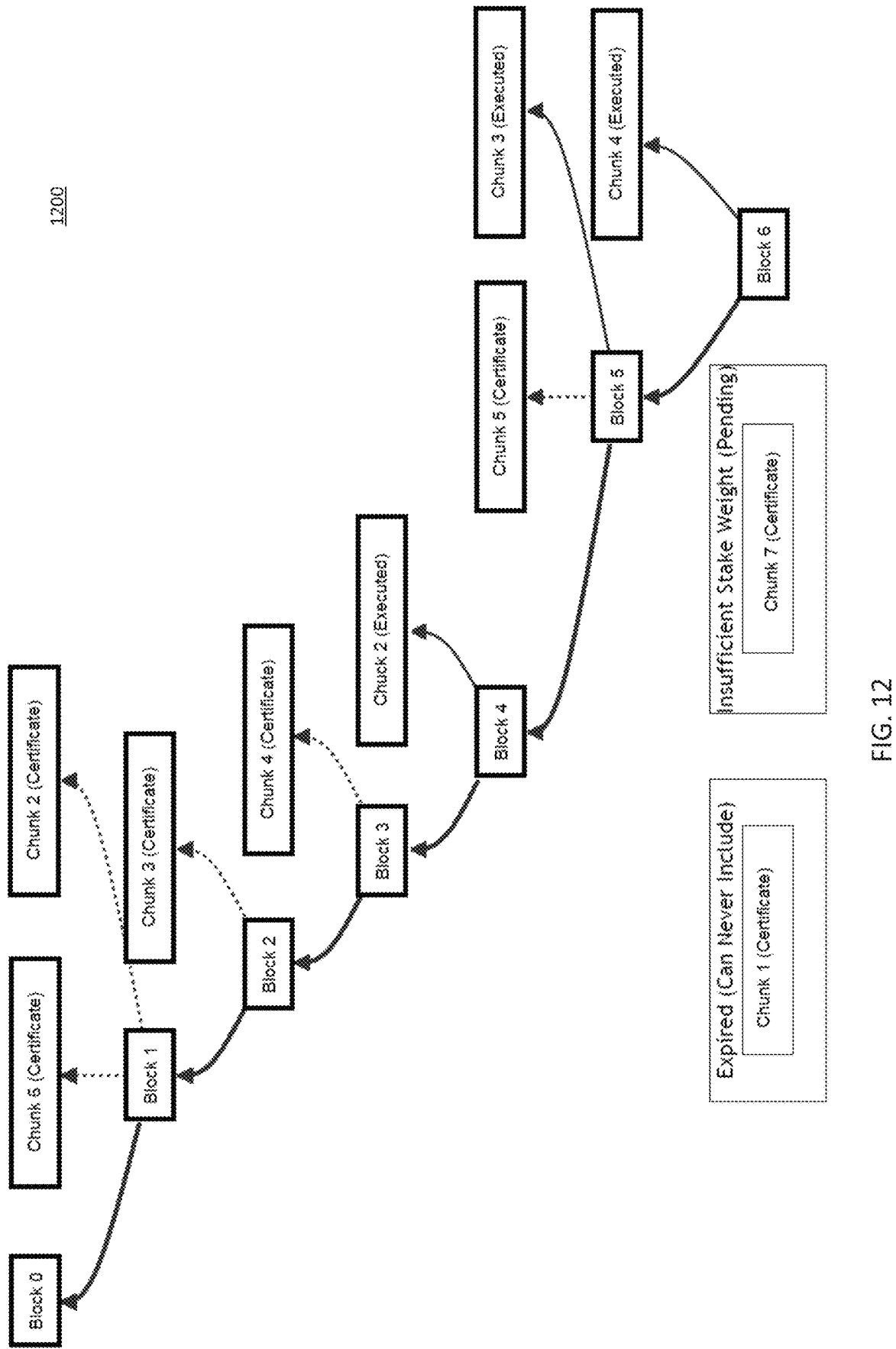
FIG. 12 is an example block structure following the chunk distribution workflow implementing the FDSMR construction, according to certain aspects of the present disclosure.

FIG. 12 is an example block structure 1200 following the chunk distribution workflow 1100 implementing the FDSMR construction, according to some embodiments. The block structure 1200 includes blocks in a blockchain network. Validators may produce one or more chunks for each of the blocks. The blockchain network may run a consensus mechanism to ensure all participants agree on the state of the blockchain. Each of the blocks include references to chunks that are distributed outside of the consensus mechanism. According to embodiments, the blocks reference the chunk certificate of properly replicated chunks prior to their execution. Accordingly, any node can see the certificate for a chunk and fetch the chunk even if the node did not receive the chunk.

Block 0 may represent a genesis block. For example, block 1 may reference the chunk certificate 2 and chunk 6 certificate, block 2 may reference the chunk 3 certificate, block 3 may reference the chunk 4 certificate, block 4 may reference an executed chunk 2, block 5 may reference the chunk 5 certificate and executed chunk 3, and block 6 may reference executed chunk 4.

According to embodiments, when a block is built and added on-chain, validators and non-validators may listen for transactions for allocated accounts over P2P. A chunk with executable transactions may be built. The chunk may include a drop account and transactions not yet allocated. The chunk may be distributed over P2P for attestations. Chunks are then signed after the network is checked for duplicated chunks and signing valid chunks. Chunks may be executed after verification of a previous block.

To provide time for validators that have not yet heard of a chunk to fetch it from the threshold stake percentage (e.g., 66%+1) that claim to have it, chunks are not executed as soon as they are included and instead are executed after a configurable delay. If this was not the case, some malicious builder could include a chunk that was not very well distributed and force the chain to sputter while the remaining stakes (e.g., 33%−1) rush to fetch it to verify the block. The sputter can be made worse if the builder meant to produce the next block is in this remaining stake set (as their build would then be delayed). The fortunate byproduct of this "sequence ahead" design is that this also allows execution to run ahead of the block that the result must be posted in (this sort of flexibility again allows for better pipelining). In the example of FIG. 12, chunk 7 has insufficient stake weight and is therefore pending certificate generation.

According to embodiments, the threshold stake percentage may be determined based on an assumed maximum number of malicious nodes in the network. Traditionally, it is assumed that there is less than f malicious nodes. Therefore, the chunks may be configured to require at least anywhere from f to (T=100%−f) of stake signing them. Requiring T of stake to sign the chunks would ensure that the chunks are maximally distributed, but could increase the latency to be able to include the transactions in the chain. Whereas requiring, for example, f of stake to sign the chunks would ensure they are included as quickly as possible, but could put all of the work onto a single node to disseminate the transaction data after inclusion. This results in a tradeoff between bandwidth efficiency and transaction latency that can be tuned based on the use case. By non-limiting example, to provide a middle ground between the tradeoffs, the threshold T may be set to 50%.

Additionally, maintaining a chain of chunk hashes instead of linking chunks together allows them to be sequenced in any order (no need to verify transactions on top of linked parents, the less data dependencies the better) and allows for syncing a chain of data from nodes, but relies on external providers for verifiable fetching of filtered data (which is also linked in each block after execution). Relying on external providers minimizes the amount of work the validation set needs to perform. In some implementations, the validation set may fetch filtered data. Once the expiry time for transactions in a block are met (e.g., the transactions have expired), the corresponding certificates can no longer be used (e.g., chuck 1 certificate).

Figure 13:
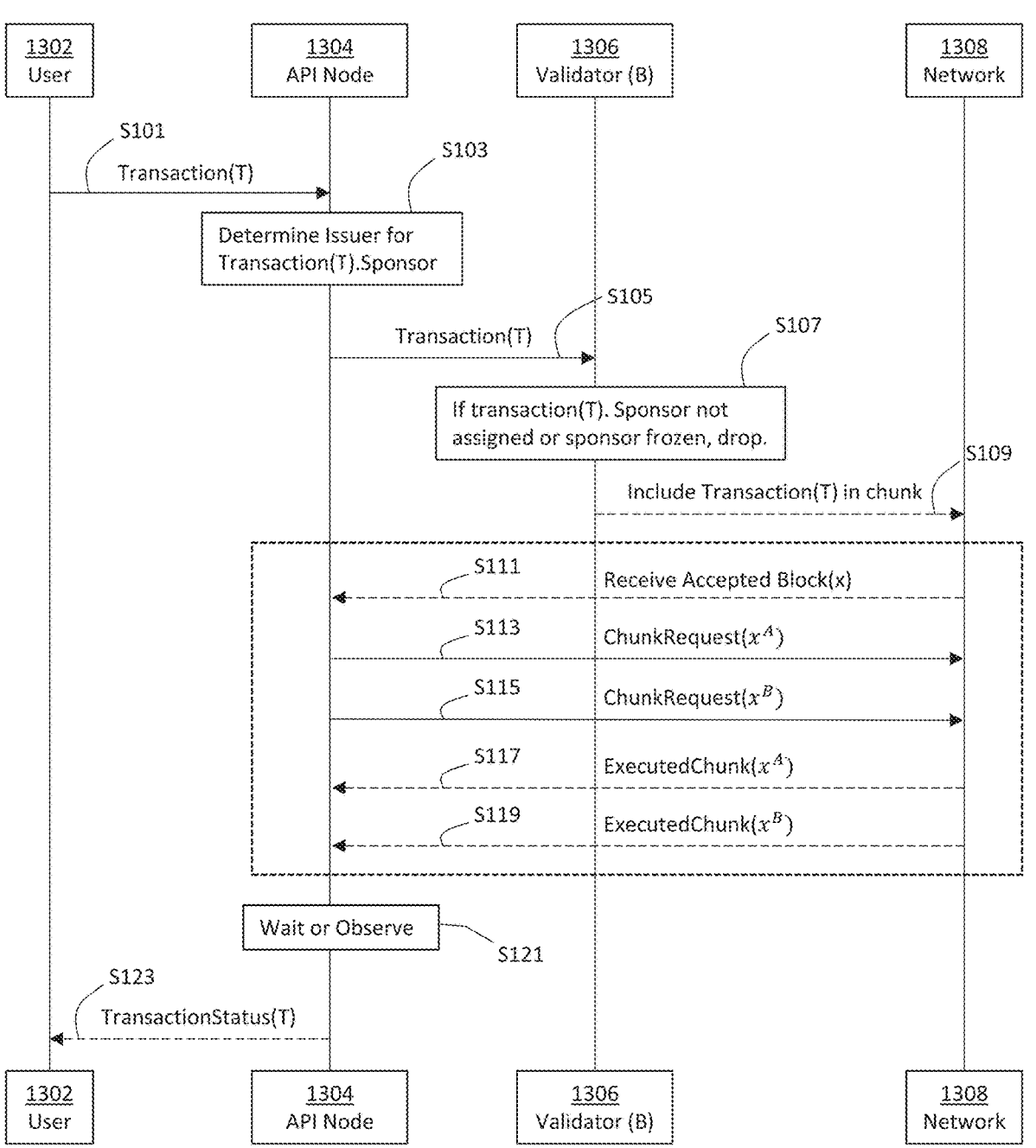
FIG. 13 is a user transaction workflow illustrating issuing of a transaction from the perspective of a user, according to certain aspects of the present disclosure.

FIG. 13 is a user transaction workflow 1300 illustrating issuing of a transaction from the perspective of a user, according to one or more embodiments. According to embodiments, at S1301, the user 1302 submits a transaction T to an API node 1304. In some embodiments, the user 1302 submits that transaction T directly to a validator. At S1303, the API node 1304 determines an issuer that the user is partitioned to for replicating and executing the transaction T (i.e., transaction(T).Sponsor). At S1305, the API node 1304 forwards the transaction T to the validator 1306. According to embodiments, users 1302 can run their own API node and propagate transactions directly to block builders. Block builders, using the FDSMR construction described, can then replicate transactions they know will pay fees.

At S1307, if the issuer for the transaction T is not assigned to the validator 1306 or the sponsor is frozen (i.e., no valid bond), the transaction T is dropped. If the transaction T is assigned and the account of the user is not frozen, at S1309, the transaction T is replicated and included in a chunk in the network 1308. The chunk distribution workflow is then initiated, wherein, at S1311, the API node 1304 receives an accepted block x from the network 1308. There is a wait for the chunk to get a percentage of stake weight on it to be signed (e.g., at S1313 and S1315) to get a valid certificate and distributed to the network 1308. The chunk is then executed (e.g., S1317 and S1319) and received at the API node 1304.

At S1321, the API node 1304 waits for the transaction T or observes the block with a timestamp greater than an expiry time for the transaction (i.e., transaction(T)Expiry). Waiting for the transaction may comprise waiting for the chunk to get signatures making up a threshold percentage of stake weight. At S1323, a transaction status (i.e., TransactionStatus(T)) is sent to the user 1302.

Figure 14:
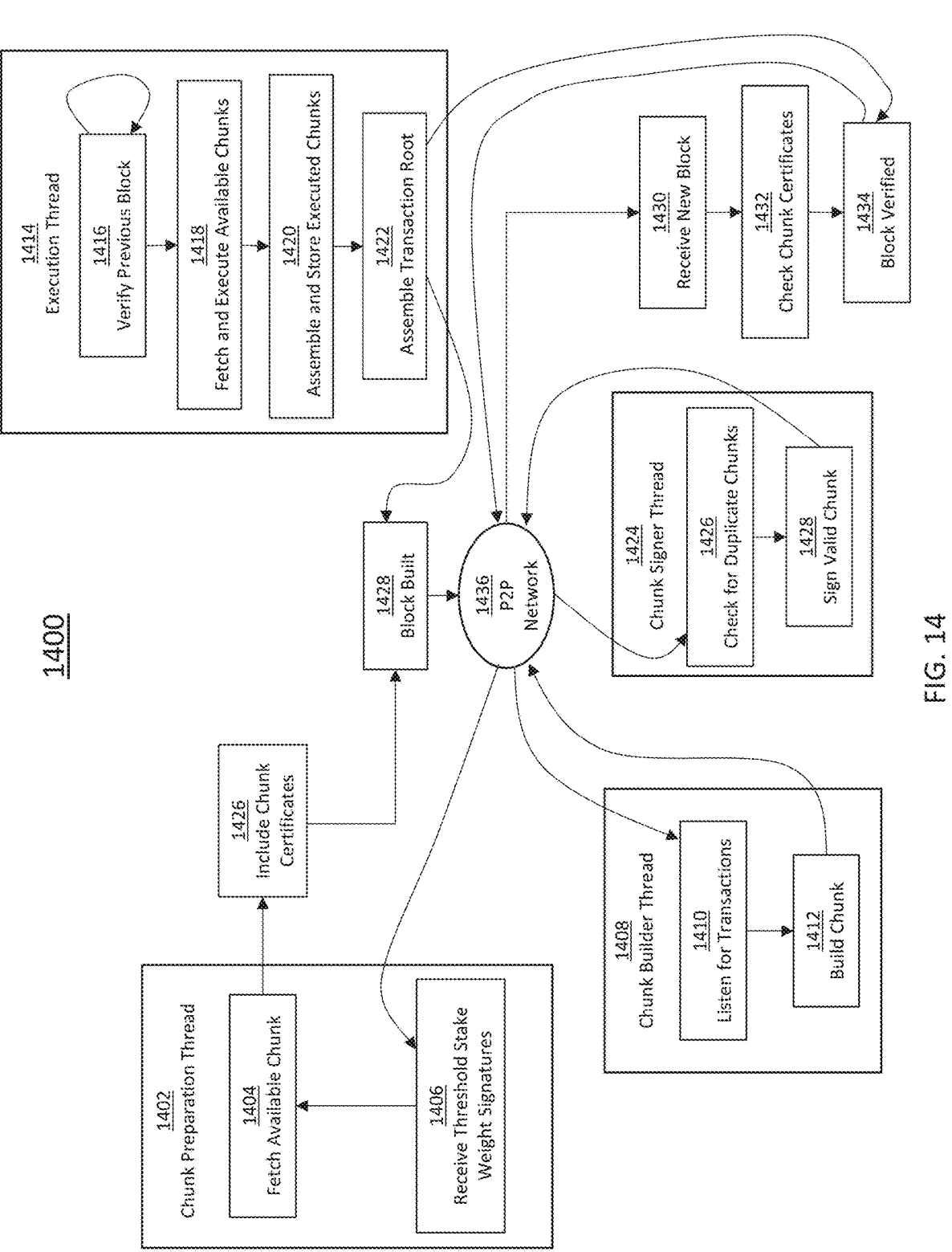
FIG. 14 is an exemplary node operation workflow in a FDSMR-supported blockchain network, according to certain aspects of the present disclosure.

FIG. 14 is an exemplary node operation workflow 1400 in a FDSMR-supported blockchain network, according to one or more embodiments. The node operations may include a chunk builder thread 1408, a chunk signer thread 1424, a chunk preparation thread 1402, and an execution thread 1414.

According to embodiments, in the chunk builder thread 1408 nodes, including validators and non-validators may listen for transactions 1410. The nodes may remove transaction not allocated and build chunk(s) 1412 based on the received transactions over the P2P network 1436. The built chunks are distributed to nodes in the P2P network 1436 for attestations. In some embodiments, only valid validators are enables to receive the distributed chunks (e.g., based on account).

According to embodiments, in the chunk preparation thread 1402, nodes in the P2P network 1436 may fetch available chunk(s) 1404. This process continues until the nodes receive threshold stake-weight signatures 1406. When the threshold is met, a chunk certificate is issued to each signing node.

According to embodiments, in the chunk signer thread 1424, nodes check for duplicate chunk(s) 1426 and sign valid chunk(s) 1428. The signed chunks may be replicated across the network 1436. The chunk certificates from all validators are included in a block 1426 (e.g., block built 1428).

According to embodiments, in the execution thread 1414, validators may verify previous blocks 1416 at a given block height, accounting for execution delays. Validators may fetch (if they don't already have) and execute available chunks 1418. The validators may then assemble and store executed chunks 1420, and assemble the transaction root 1422. The transaction root may be included in the block built 1428 and used in block verification (i.e., block verified 1434).

According to embodiments, one or more nodes in the network may receive a new block 1430 from the P2P network 1436, check chunk certificates 1432 for chunks associated with the new block have the threshold stake weight signatures. Based on this, the block may be verified 1434.

FIG. 15 illustrates an example flow diagram (e.g., process 1500) for executing transactions in a blockchain network while increasing blockchain throughput and preventing decoupled state machine replication vulnerabilities, according to certain aspects of the disclosure. For explanatory purposes, the steps of the example process 1500 are described herein as occurring in serial, or linearly. However, multiple instances of the example process 1500 may occur in parallel, overlapping in time, almost simultaneously, or in a different order from the order illustrated in the process 1500. In addition, the blocks of the example process 1500 need not be performed in the order shown and/or one or more of the blocks of the example process 1500 need not be performed.

At step 1502, the process 1500 may include receiving one or more transactions issued from an account. The account may include a bond balance locked in the account by a user upon creation of the account. Each of the transactions may be associated with a transaction ID and an expiry window.

At step 1504, the process 1500 may include periodically partitioning the account to a subset of validators in the blockchain network enabled to receive transactions from the account. Each validator in the subset may be responsible for a different partition of the account. The bond balance may be divided by the number of account partitions to cover transaction fees for each validator executing its corresponding transactions.

At step 1506, the process 1500 may include partitioning the transactions into the subset of validators.

At step 1508, the process 1500 may include producing chunks and replicating the chunks to nodes in the network.

At step 1510, the process 1500 may include generating, based on receiving at least a threshold of stake signatures from the nodes, blocks that reference the replicated chunks.

At step 1512, the process 1500 may include distributing, from the bond balance, funds to the nodes for including the replicated chunks in the blocks.

According to some embodiments, the process 1500 may further include overlapping epochs such that, for example, a first chunk may be added in a block and a second chunk may be simultaneously replicated to nodes (e.g., validators) in the network.

According to embodiments, the bond balance may indicate the number of the transactions that can be issued by the account at a given time.

According to some embodiments, the process 1500 may further include determining whether the bond balance is sufficient to cover transaction fees for executing replicated transactions. Based on the bond balance being insufficient, the account may be frozen. Based on the bond balance being sufficient, funds from the bond balance may be distributed to block builders including the transactions on-chain.

According to some embodiments, the process 1500 may further include partitioning transactions into overlapping epochs, wherein chunks are set, replicated, and executed in each epoch. The bond balance may be divided by the number of overlapping epochs, taking into account transactions that may be issued in each of the overlapping epochs at the same time. The overlapping epochs may have non-overlapping windows for transaction assignment into chunks using expiry times. According to embodiments, transactions can no longer be executed after the expiry time has lapsed.

According to some embodiments, the process 1500 may further include filtering the replicated chunks for valid transactions. The process 1500 may further include generating hashes for the valid transactions. The hashes may be sequenced in a chain in any order. The process 1500 may further include syncing, to a new node in the network, data for the valid transactions using the hashes.

According to some embodiments, the process 1500 may further include generating chunk certificates based on at least a threshold stake of validators signing the transactions in the chunks. The chunk certificate may be included in the blocks generated at step 1510.

The techniques described herein (for example, process 1500) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 5 may be performed by a processor circuit executing instructions stored in a memory circuit, in a client device, a remote server or a database, communicatively coupled through a network (e.g., processors 205, memories 220, participant 110, participant 130, database(s) 152, and network 150).

Although FIG. 15 shows example blocks of the process 1500, in some implementations, the process 1500 may include additional blocks, fewer blocks, different blocks, or differently arranged blocks than those depicted in FIG. 5.

Hardware Overview

Figure 16:
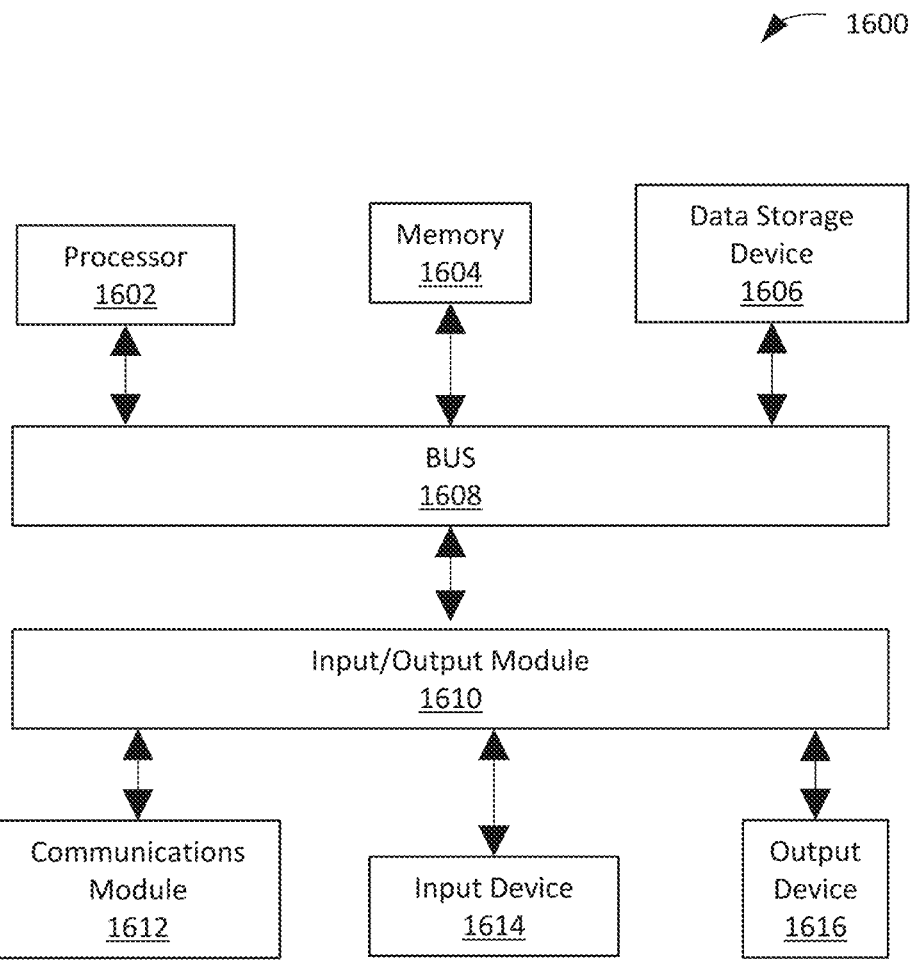
FIG. 16 is a block diagram illustrating an example computer system with which aspects of the subject technology can be implemented.

FIG. 16 is a block diagram illustrating an exemplary computer system 1600 with which aspects of the subject technology can be implemented. In certain aspects, the computer system 1600 may be implemented using hardware or a combination of software and hardware, either in a dedicated server, integrated into another entity, or distributed across multiple entities.

The computer system 1600 (e.g., server and/or participant) includes a bus 1608 or other communication mechanism for communicating information, and a processor 1602 coupled with the bus 1608 for processing information. By way of example, the computer system 1600 may be implemented with one or more processors 1602. Each of the one or more processors 1602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1600 can include, in addition to hardware, code that creates an execution environment for the computer program in question, e.g., code that constitutes processor firmware, a protocol stack, a database management system, an operating system, or a combination of one or more of them stored in an included memory 1604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1608 for storing information and instructions to be executed by processor 1602. Processor 1602 and memory 1604 can be supplemented by, or incorporated in, special purpose logic circuitry.

The instructions may be stored in memory 1604 and implemented in one or more computer program products, i.e., one or more modules of computer program instructions encoded on a computer-readable medium for execution by, or to control the operation of, the computer system 1600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1604 may also be used for storing temporary variable or other intermediate information during execution of instructions to be executed by the processor 1602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 1600 further includes a data storage device 1606 such as a magnetic disk or optical disk, coupled to bus 1608 for storing information and instructions. The computer system 1600 may be coupled via input/output module 1610 to various devices. The input/output module 1610 can be any input/output module. Exemplary input/output modules 1610 include data ports such as USB ports. The input/output module 1610 is configured to connect to a communications module 1612. Exemplary communications modules 1612 include networking interface cards, such as Ethernet cards and modems. In certain aspects, the input/output module 1610 is configured to connect to a plurality of devices, such as an input device 1614 and/or an output device 1616. Exemplary input devices 1614 include a keyboard and a pointing device, e.g., a mouse or a trackball, by which a user can provide input to the computer system 1600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1616 include display devices such as an LCD (liquid crystal display) monitor, for displaying information to the user.

According to one aspect of the present disclosure, the above-described systems can be implemented using a computer system 1600 in response to the processor 1602 executing one or more sequences of one or more instructions contained in the memory 1604. Such instructions may be read into memory 1604 from another machine-readable medium, such as data storage device 1606. Execution of the sequences of instructions contained in the main memory 1604 causes the processor 1602 to perform the process steps described herein. One or more processors in a multi-processing arrangement may also be employed to execute the sequences of instructions contained in the memory 1604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1600 can include clients and servers. A client and server are generally remote from each other and typically interact through a communication network. The relationship of client and server arises by virtue of computer programs running on the respective computers and having a client-server relationship to each other. The computer system 1600 can be, for example, and without limitation, a desktop computer, laptop computer, or tablet computer. The computer system 1600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 1602 for execution. Such a medium may take many forms, including, but not limited to, non-volatile media, volatile media, and transmission media. Non-volatile media include, for example, optical or magnetic disks, such as the data storage device 1606. Volatile media include dynamic memory, such as the memory 1604. Transmission media include coaxial cables, copper wire, and fiber optics, including the wires that comprise the bus 1608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method, the method comprising:

issuing one or more transactions from an account, the account comprising a bond balance and each transaction associated with a transaction identification (ID) and an expiry time;

partitioning the transactions to a set of validators based on a temporal partitioning scheme, wherein each validator is authorized to replicate transactions for the account during a corresponding epoch;

producing, at the set of validators, chunks including the transactions;

replicating the chunks to nodes in a blockchain network;

generating, based on receiving at least a threshold of stake signatures from the nodes, blocks that reference the replicated chunks; and distributing, from the bond balance, funds to the nodes for including the replicated chunks in the blocks, wherein the funds are distributed either as transaction fees for valid transactions or as compensation for invalid transactions.

2. The computer-implemented method of claim 1, further comprising adding a first chunk in a block and simultaneously replicating a second chunk to the nodes in the network.

3. The computer-implemented method of claim 1, wherein the bond balance includes funds locked up by a user upon creation of the account.

4. The computer-implemented method of claim 1, wherein the bond balance indicates a number of the transactions that can be issued by the account at a given time.

5. The computer-implemented method of claim 1, further comprising:

determining whether the bond balance is sufficient to cover transaction fees for executing transactions in the replicated chunks;

based on the bond balance being insufficient, freezing the account; and based on the bond balance being sufficient, distributing funds from the bond balance to block builders including the transactions on-chain.

6. The computer-implemented method of claim 1, further comprising:

sub-partitioning the account to a subset of validators, wherein each validator in the subset is responsible for a different sub-partition of the account, and wherein the bond balance is divided by a number of sub-partitions to cover transaction fees for each validator executing its corresponding transactions.

7. The computer-implemented method of claim 6, wherein the transaction can no longer be executed after the expiry time.

8. The computer-implemented method of claim 1, wherein partitioning the transactions into the set of validators further comprises:

partitioning transactions into overlapping epochs, wherein chunks including the transactions are set, replicated, and executed in each epoch; and dividing the bond balance by a number of overlapping epochs to account for the transactions issued in each of the overlapping epochs.

9. The computer-implemented method of claim 8, wherein the overlapping epochs have non-overlapping windows for transaction assignment into chunks using expiry times.

10. The computer-implemented method of claim 1, further comprising:

filtering the replicated chunks for valid transactions;

generating hashes for the valid transactions, wherein the hashes are sequenced in a chain in any order; and syncing, to a new node in the network, data for the valid transactions using the hashes.

11. The computer-implemented method of claim 1, further comprising:

generating chunk certificates based on at least a threshold stake of validators signing the transactions in the chunks, wherein the blocks reference the chunk certificates.

12. A system, comprising:

one or more processors; and a memory comprising instructions stored thereon, which when executed by the one or more processors, causes the one or more processors to:

issue one or more transactions from an account, the account comprising a bond balance locked in the account by a user upon creation of the account and each transaction associated with a transaction ID and an expiry time;

partition the transactions to a set of validators based on a temporal partitioning scheme, wherein each validator is authorized to replicate transactions for the account during a corresponding epoch;

produce, at the set of validators, chunks including the transactions;

replicate the chunks to nodes in a blockchain network;

generate, based on receiving at least a threshold of stake signatures from the nodes, blocks that reference the replicated chunks; and distribute, from the bond balance, funds to the nodes for including the replicated chunks in the blocks, wherein the funds are distributed either as transaction fees for valid transactions or as compensation for invalid transactions.

13. The system of claim 12, wherein the instructions, when executed by the one or more processors, cause the one or more processors to add a first chunk in a block and simultaneously replicating a second chunk to the nodes in the blockchain network.

14. The system of claim 12, wherein the instructions, when executed by the one or more processors, cause the one or more processors to:

determine whether the bond balance is sufficient to cover transaction fees for executing transactions in the replicated chunks;

based on the bond balance being insufficient, freeze the account; and based on the bond balance being sufficient, distribute funds from the bond balance to block builders including the transactions on-chain.

15. The system of claim 12, wherein the instructions, when executed by the one or more processors, cause the one or more processors to:

sub-partition the account to a subset of validators, wherein each validator in the subset is responsible for a different sub-partition of the account, and wherein the bond balance is divided by a number of sub-partitions to cover transaction fees for each validator executing its corresponding transactions.

16. The system of claim 12, wherein the instructions, when executed by the one or more processors, cause the one or more processors to:

partition transactions into overlapping epochs, wherein chunks including the transactions are set, replicated, and executed in each epoch; and divide the bond balance by a number of overlapping epochs to account for the transactions issued in each of the overlapping epochs, wherein the overlapping epochs have non-overlapping windows for transaction assignment into chunks using expiry times.

17. The system of claim 12, wherein the instructions, when executed by the one or more processors, cause the one or more processors to:

filter the replicated chunks for valid transactions;

generate hashes for the valid transactions, wherein the hashes are sequenced in a chain in any order; and sync, to a new node in the blockchain network, data for the valid transactions using the hashes.

18. The system of claim 12, wherein the instructions, when executed by the one or more processors, cause the one or more processors to:

generate chunk certificates based on at least a threshold stake of validators signing the transactions in the chunks, wherein the blocks reference the chunk certificates.

19. A non-transitory computer-readable storage medium comprising instructions stored thereon, which when executed by one or more processors, cause the one or more processors to perform operations in a blockchain network, comprising:

receiving one or more transactions from an account, the account comprising a bond balance locked in the account by a user upon creation of the account, and each of the transactions are associated with a transaction identification (ID) and an expiry time;

periodically partitioning, based on the account, the transactions to a subset of validators in the blockchain network enabled to receive transactions from the account;

replicating the chunks to nodes in the blockchain network based on a temporal partitioning scheme, wherein each validator is authorized to replicate transactions for the account during a corresponding epoch;

generating, based on receiving at least a threshold of stake signatures from the nodes, blocks that reference the replicated chunks; and distributing, from the bond balance, funds to the nodes for including the replicated chunks in the blocks, wherein the funds are distributed either as transaction fees for valid transactions or as compensation for invalid transactions.

20. The non-transitory computer-readable storage medium of claim 19, wherein the instructions, when executed by the one or more processors, cause the one or more processors to perform operations including:

filtering the replicated chunks for valid transactions;

generating hashes for the valid transactions, wherein the hashes are sequenced in a chain in any order; and syncing, to a new node in the blockchain network, data for the valid transactions using the hashes.

\* \* \* \* \*